US008619775B2

(12) United States Patent
Amir et al.

(10) Patent No.: US 8,619,775 B2
(45) Date of Patent: Dec. 31, 2013

(54) SCALABLE FLOW TRANSPORT AND DELIVERY NETWORK AND ASSOCIATED METHODS AND SYSTEMS

(75) Inventors: Yair Amir, Bethesda, MD (US); Michal Miskin-Amir, Bethesda, MD (US); Yousef Javadi, Potomac, MD (US); Malik Khan, Bethesda, MD (US); Jonathan Stanton, Chevy Chase, MD (US)

(73) Assignee: LTN Global Communications, Inc., Savage, MD (US)

( * ) Notice: Subject to any disclaimer, the term of this patent is extended or adjusted under 35 U.S.C. 154(b) by 895 days.

(21) Appl. No.: 12/506,725

(22) Filed: Jul. 21, 2009

(65) Prior Publication Data

US 2010/0014528 A1 Jan. 21, 2010

Related U.S. Application Data

(60) Provisional application No. 61/082,270, filed on Jul. 21, 2008, provisional application No. 61/086,987, filed on Aug. 7, 2008, provisional application No. 61/140,065, filed on Dec. 22, 2008, provisional application No. 61/664,459, filed on Apr. 3, 2009.

(51) Int. Cl.
*H04L 12/28* (2006.01)
(52) U.S. Cl.
USPC ............ 370/390; 370/408; 370/465; 709/231
(58) Field of Classification Search
USPC ......................................... 370/400, 401, 406
See application file for complete search history.

(56) References Cited

U.S. PATENT DOCUMENTS

| 4,672,543 | A | 6/1987 | Matsui et al. |
| 5,664,091 | A | 9/1997 | Keen |
| 5,892,910 | A | 4/1999 | Safadi |
| 6,467,008 | B1 | 10/2002 | Gentry, Jr. et al. |
| 6,493,316 | B1 | 12/2002 | Chapman et al. |
| 6,611,872 | B1 | 8/2003 | McCanne |
| 6,694,469 | B1 | 2/2004 | Jalali et al. |
| 6,901,445 | B2 | 5/2005 | McCanne et al. |
| 7,042,869 | B1 | 5/2006 | Bender |
| 7,080,157 | B2 | 7/2006 | McCanne |
| 7,096,281 | B2 * | 8/2006 | Brabson et al. ............... 709/249 |
| 7,133,928 | B2 | 11/2006 | McCanne |
| 7,206,280 | B1 | 4/2007 | Khan et al. |

(Continued)

FOREIGN PATENT DOCUMENTS

GB 2478397 B 10/2012

OTHER PUBLICATIONS

"N-way Fail-Over Infrastructure for Reliable Servers and Routers", Amir, Caudy, Munjal, Schlossnagle, and Tutu, IEEE Dependable Systems and Networks, Jun. 2003, pp. 403-412.*

(Continued)

*Primary Examiner* — Brian O'Connor
(74) *Attorney, Agent, or Firm* — Venable LLP; Robert S. Babayi

(57) ABSTRACT

A Flow Transport and Delivery Network (FTDN) supports delivery and transport of flows to destination nodes over parallel overlay networks. Overlay nodes executing overlay processes create and maintain one or more overlay networks. A plurality of sites are connected to each other via the parallel overlay networks with each site comprising one or more transit routers that route the flows to the destination nodes.

122 Claims, 10 Drawing Sheets

(56) References Cited

U.S. PATENT DOCUMENTS

| | | | |
|---|---|---|---|
| 7,289,441 B1* | 10/2007 | Barach | 370/230 |
| 7,289,520 B2* | 10/2007 | Xu et al. | 370/400 |
| 7,340,505 B2* | 3/2008 | Lisiecki et al. | 709/217 |
| 7,415,527 B2* | 8/2008 | Varadarajan et al. | 709/231 |
| 7,483,439 B2* | 1/2009 | Shepherd et al. | 370/401 |
| 7,532,621 B2* | 5/2009 | Birman et al. | 370/389 |
| 7,567,515 B2 | 7/2009 | Shen | |
| 7,643,426 B1* | 1/2010 | Lee et al. | 370/238 |
| 7,733,868 B2* | 6/2010 | Van Zijst | 370/394 |
| 7,734,730 B2* | 6/2010 | McCanne | 709/219 |
| 7,761,767 B2 | 7/2010 | Chandra et al. | |
| 7,778,165 B2* | 8/2010 | Madhyastha et al. | 370/229 |
| 7,792,915 B2* | 9/2010 | Berkey et al. | 709/209 |
| 7,839,798 B2* | 11/2010 | Tang et al. | 370/254 |
| 8,117,328 B2* | 2/2012 | Choi et al. | 709/231 |
| 8,181,210 B2* | 5/2012 | Amir et al. | 725/98 |
| 8,196,205 B2* | 6/2012 | Gribble et al. | 726/24 |
| 8,433,788 B2* | 4/2013 | Nakahira | 709/224 |
| 8,437,267 B2* | 5/2013 | Amir et al. | 370/252 |
| 2002/0064167 A1 | 5/2002 | Khan et al. | |
| 2003/0088696 A1 | 5/2003 | McCanne | |
| 2003/0120917 A1* | 6/2003 | Itonaga et al. | 713/163 |
| 2003/0147371 A1 | 8/2003 | Choi et al. | |
| 2004/0010616 A1 | 1/2004 | McCanne | |
| 2004/0098502 A1* | 5/2004 | Xu et al. | 709/238 |
| 2005/0015511 A1* | 1/2005 | Izmailov et al. | 709/238 |
| 2005/0058149 A1 | 3/2005 | Howe | |
| 2005/0198290 A1* | 9/2005 | Berkey et al. | 709/225 |
| 2005/0289623 A1 | 12/2005 | Midani et al. | |
| 2006/0167784 A1 | 7/2006 | Hoffberg | |
| 2006/0268871 A1* | 11/2006 | Van Zijst | 370/390 |
| 2007/0028002 A1 | 2/2007 | McCanne | |
| 2007/0162945 A1 | 7/2007 | Mills | |
| 2007/0168825 A1 | 7/2007 | Jalali et al. | |
| 2007/0223495 A1 | 9/2007 | Fukui | |
| 2007/0230352 A1* | 10/2007 | Kokku et al. | 370/238 |
| 2008/0098450 A1 | 4/2008 | Wu et al. | |
| 2008/0134258 A1* | 6/2008 | Goose et al. | 725/91 |
| 2008/0140853 A1 | 6/2008 | Harrison | |
| 2008/0209297 A1 | 8/2008 | Chandra et al. | |
| 2008/0215681 A1* | 9/2008 | Darcie et al. | 709/204 |
| 2009/0207840 A1 | 8/2009 | McCanne | |

OTHER PUBLICATIONS

"Extended Virtual Synchrony", Moser, Amir, Melliar-Smith, and Agarwal, IEEE Distributed Computing Systems, Jun. 1994, pp. 56-65.*

International Search Report and Written Opinion mailed Nov. 24, 2009 issued in PCT/US2009/051279.

Yair Amir et al: "An Opportunity Cost Approach for Job Assigment in a Scalable Computing Cluster" affiliated with the Department of Computer Science, the John Hopkins University, Baltimore, MD 21218, 2000.

Baruch Awerbuch et al: "Throughput-Competitive On-Line Routing" to appear in Proc. 34'th Conf. on Found. of Computer Science, Oct. 1993.

David Andersen et al: "Resilient Overlay Networks" in Proceedings of ACM SOSP, 2001, describe the Resilent Overlay Network (RON) technology (also available at http://NMS/csail.mit.edu/ron/).

Yair Amir et al: "Reliable Communications in Overlay Networks", in the Proceedings of the IEEE International Conference on Dependable Systems and Networks )DSN03) San Francisco, Jun. 2003 pp. 1-10.

Yair Amir et al: "1-800-OVERLAYS: Using Overlay Networks to Improve VpIP Quality", with the same authors in the Proceedings of the International Workshop on Network and Operating Systems Support for Digital Audio and Video (NOSSDAV) pp. 51-56, Skamania, Washington, 2005.

Suman Banerjee et al: "Scalable Application Layer Multicast", in: Proceedings of ACM SIGCOMM, Aug. 2002.

K.K. To et al: "Parallel overlays for high data-rate multicast data transfer" The International Journal of Computer and Telecommunications Networking, vol. 51, issue 1, pp. 31-42, May 19, 2006.

Yair Amir et al: "Performance and Functionality in Overlay Networks" by Claudiu Danilov Baltimore, Maryland Sep. 2004.

Yair Amir et al: "An Overlay Architecture for High Quality VoIP Streams" Yair Amir, Member in IEEE, Transaction on Multimedia, 8(6), pp. 1250-1262, Dec. 2006.

Birman, K. et al., "Exploiting Virtual Synchrony in Distributed Systems", Proceedings of the ACM Symposium on Operating Systems Principles, pp. 123-138, Nov. 1987.

Francis, Paul, "Yoid: Extending the Internet Multicast Architecture.", In a Technical Report dated Apr. 2000, pp. 1-40.

International Search Report issued on Jun. 3, 2010 in PCT/US2010/029977.

Written Opinion issued on Jun. 3, 2010 in PCT/US2010/029977.

Zhang et al. "Universal IP Multicast Delivery", Computer Networks, special issue of on Overlay Distribution Structures and Their Applications, Apr. 2006, pp. 781-806.

Zhang et al. "Universal IP Multicast Delivery", Fourth International Workshop on Networked Group Communication (NGC), vol. 51, issue 1, pp. 31-42, Oct. 2002.

Okada et al., "A Cooperative Routing Method for Multiple Overlay Networks" (Consumer Communications and Networking Conference, Jan. 10-13, 2009, CCNC, 6th IEEE).

International Search Report of International Application No. PCT/US2009/069238.

Notice of Allowance issued in U.S. Appl. No. 12/537,582 dated Apr. 11, 2012.

Notice of Allowance issued in U.S. Appl. No. 12/537,582 dated Feb. 13, 2012.

Notice of Allowance issued in U.S. Appl. No. 12/644,796 dated Jan. 11, 2013.

Office Action issued in U.S. Appl. No. 12/537,582 dated Jun. 13, 2011.

Office Action issued in U.S. Appl. No. 12/537,582 dated Oct. 19, 2011.

Office Action issued in U.S. Appl. No. 12/537,582 dated Oct. 28, 2010.

Office Action issued in U.S. Appl. No. 12/644,796 dated Aug. 3, 2011.

Office Action issued in U.S. Appl. No. 12/644,796 dated Jan. 3, 2012.

Office Action issued in U.S. Appl. No. 12/644,796 dated Jul. 26, 2011.

Office Action issued in U.S. Appl. No. 12/753,459 dated Nov. 23, 2012.

* cited by examiner

SCALABLE FLOW TRANSPORT AND DELIVERY NETWORK AND ASSOCIATED METHODS AND SYSTEMS

RELATED APPLICATIONS

This non-provisional application incorporates by reference the following provisional applications in their entirety: Provisional Application Ser. No. 61/082,270, filed Jul. 21, 2008; Provisional Application Ser. No. 61/086,987, filed Aug. 7, 2008; Provisional Application Ser. No. 61/140,065, filed Dec. 22, 2008; and Provisional Application Ser. No. 61/664,459, filed Apr. 3, 2009.

FIELD OF THE INVENTION

The present invention generally relates to the field of network systems and more particularly to multiple logical overlay networks implemented over a physical network for transport and delivery of flows.

BACKGROUND OF THE INVENTION

It is known to transmit live flows of information or content, e.g., linear television programming and event videos, over satellite networks. Satellite networks are architected to provide one-to-many connectivity. A single television channel, for example, can be uplinked from a ground-based antenna to a satellite transponder and then broadcast to any number of ground-based receiver antennas in the footprint of that satellite's signal. This method has served the television industry for over three decades and has economic appeal to content providers who have a large group of receivers that all want the same content at the same time. However, several issues that are not addressed well by this architecture. For example, content that is customized to different sub-groups of receivers requires dedicated transponder space for each unique flow, which in turn makes this architecture economically unattractive for these content providers. Also, satellites are not architected for two-way flows, which reduces their appeal to interactive content providers. Lastly, for a variety of reasons, live video content has grown exponentially over the last several years. These content providers need a system that has the flexibility to add or drop new content quickly, easily and inexpensively, and to be able to economically deliver this content only to those receivers that specifically request it. Satellite architecture does not provide the flexibility, timeliness or cost structure to support these content providers.

The Internet has seen an explosion in video traffic over the last several years. While most of the video traffic available over the Internet has been non-live short-form videos like those available on sites like YouTube, there has been a growth in live streaming over the Internet. A live source of video, like a standalone digital camera or cell phone with a built-in camera, can upload a live video to a media server site. Users with compatible media players can request the video from the server by using the World Wide Web and typing in the appropriate URL from a browser or media player. The media server then streams the live video to the user. Professional content providers, however, have not adopted Internet streaming in a significant way for several reasons. First, the architecture used by the Internet is unicast, which means each user gets a unique stream that traverses the network from the server to the user. For content with a large audience, this is prohibitively expensive in bandwidth. Second, the Internet has poor reliability and consistency in terms of delay, loss of packets and jitter, all of which can substantially degrade the quality of the delivered video. Media players use large buffers to smooth out these artifacts, which (a) cannot handle long-lived issues, and (b) add significant latency to a live stream.

Dedicated point-to-point links, for example those over optical fiber, are used to ingest professional live video content from a source location, like a studio or a stadium, to a broadcasting site. These networks have the advantage of consistent performance and low latency, thus enabling them to deliver high quality video with little or no degradation. However, they have the disadvantage of being point-to-point transport methods and therefore cannot economically deliver these live flows to multiple locations.

Various routing schemes for delivery of end-to-end information and data over a network are known. They include broadcast, multicast, unicast and anycast. Such schemes usually attempt to deliver data from one point or node to one or more other points or nodes over a network. For example, broadcasting refers to transmitting an information packet to every node on the network and unicasting refers to the transmitting information packets to a single destination node.

Multicast is a protocol for the delivery of information to a group of destinations simultaneously over the network. Generally, multicast protocols attempt to use the most efficient process to deliver messages over each link of the network only once, creating copies only when the paths to the destinations split. One implementation of multicast is on the Internet Protocol (IP) routing level, where routers create distribution paths for datagrams sent to a multicast destination address, while typically not guaranteeing reliability or delivery latency. But there are also other implementations of the multicast distribution strategy.

IP Multicast is a technique for one to many communication over an IP infrastructure. It can scale to a large receiver population for a small number of wide-area groups. The limit to a small number of wide-area groups is an architectural limitation of multicast at layer 3 because the state of each group must be continually monitored leading to unsustainable overhead. The sender does not need to know the identity of the receivers. Multicast utilizes network infrastructure efficiently by requiring the source to send a packet only once, even if it needs to be delivered to a large number of receivers. The routers in the network take care of replicating the packet to reach multiple receivers only where necessary. IP Multicast utilizes such concepts as IP Multicast group addresses, multicast distribution trees and receiver driven tree creation.

IP Multicast over the Internet, however, suffers from a number of drawbacks. It is susceptible to Internet anomalies and thus unreliable. Moreover, implementation of large-scale services over the Internet via IP Multicast is problematic because it is generally not supported by Internet Service Providers (ISPs). Other disadvantages of IP Multicast are that the assignment of group identifiers is not coordinated and that the management overhead associated with supporting many wide-area groups is not scalable.

A peer to peer (P2P) network uses diverse connectivity between end-user participants in a network and their cumulative bandwidth, rather than conventional centralized resources where a relatively small number of servers provide the core bandwidth and computing for a service or application. P2P networks are typically used for connecting nodes via largely ad hoc connections. P2P networks have been used for sharing files containing audio, video, data or anything in digital format. P2P networks, however, do not provide manageability and control since content passes through many third-party hosts. Additionally, they introduce higher and unpredictable delay for information dissemination, which inhibits effective interactivity. P2P networks also require special client software that may introduce security concerns.

Also known are content delivery or distribution networks referred to as (CDN). A CDN is a system of computers or storage devices networked together across the Internet that cooperate transparently to deliver content to end users, most often for the purpose of improving performance, scalability, and cost efficiency. Storage based CDNs, however, require large amounts of storage and a significant investment in infrastructure to support large scale and high bandwidth or high speed applications like HD video broadcast. Storage and additional required IO operations add delay both during the copy to edge nodes, as well as during playback from edge nodes to clients. As a result, such systems do not provide live, real-time distribution to all of their users. Additionally, such systems do not provide fine-grained synchronization between all of the viewers and do not support bi-directional interactive content exchange (such as a town-hall meeting with remote participants). Such systems have a high fixed cost to support large scale and high quality video broadcast. Implementation of a storage-based CDN requires the purchase of storage devices and servers based on potential use, not actual use.

Known online gaming technologies connect players together over a computer network, such as the Internet. Massively multiplayer online games (MMOGs) have been developed using client-server system architectures to create diverse game worlds and communities. The software that generates and persists the "world" runs continuously on a server, and players connect to it via client software. The client software may provide access to the entire playing world. Depending on the number of players and the system architecture, a MMOG might actually be run on multiple separate servers, each representing an independent instance of the world, where players from one server cannot interact with those from another. In many MMOGs, the number of players in one instance of the world is often limited to a few thousands. In this way, various servers provide various instances of the games that are shared by the players. However, players under MMOG architecture do not have a global all-inclusive view of the world since different users are on different instances of the game. Additionally, the scalability of MMOGs is impacted by the locations the clients connect from and the real-time requirements of the actual games.

Overlay networks are opening new ways to Internet usability, mainly by adding new services (e.g. built-in security) that are not available or cannot be implemented in the current Internet, and also by providing improved services such as higher availability. An overlay network is a computer network that is built on top of another network. Nodes in the overlay can be thought of as being connected by virtual or logical links, each of which corresponds to a path, perhaps through many physical links, in the underlying network. An overlay network can implement different types of protocols at the logical level, including protocols materially different from those implemented at the physical level. The concept of overlay networks is often viewed to include many different systems such as P2P, dial-up modems over the telephone network, or even some types of CDNs which are discussed previously. Usually, the usage of overlay networks may come with a price, for example, in added latency that is incurred due to longer paths created by overlay routing, and by the need to process the messages in the application level by every overlay node on the path. An overlay network constructs a user level graph on top of an existing networking infrastructure such as the Internet, using only a subset of the available network links and nodes. An overlay link is a virtual edge in this graph and may consist of many actual links in the underlying network.

Overlay nodes act as routers, forwarding packets to the next overlay link toward the destination. At the physical level, packets traveling along a virtual edge between two overlay nodes follow the actual physical links that form that edge. Overlay networks have two main drawbacks. First, the overlay routers incur some overhead every time a message is processed, which requires delivering the message to the application level, processing it, and resending the message to the next overlay router. Second, the placement of overlay routers in the topology of the physical network is often far from optimal, because the creator of the overlay network rarely has control over the physical network (usually the Internet) or even the knowledge about its actual topology. Therefore, overlay networks provide longer paths that have higher latency than point-to-point Internet connections. The easiest way to achieve reliability in overlay networks is to use a reliable protocol, usually TCP, between the end points of a connection. This mechanism has the benefit of simplicity in implementation and deployment, but pays a high price upon recovery from a loss. As overlay paths have higher delays, it takes a relatively long time to detect a loss, and data packets and acknowledgments are sent on multiple overlay hops in order to recover the missed packet.

A particular class of overlay networks are herein referred to as Message-Oriented Overlay Networks (MOON). MOON is a specific type of overlay network that maintains control and management over the overlay nodes based on communicated messages. MOONs provide network services that manipulate the messages which pass through the overlay network to improve the reliability, latency, jitter, routing, or other network properties, or to add new network capabilities and services. MOONs do not use persistent storage to store data messages during transit.

Reliable point-to-point communication is one of the main utilizations of the Internet, where over the last few decades TCP has served as the dominant protocol. Over the Internet, reliable communication is performed end-to-end in order to address the severe scalability and interoperability requirements of a network in which potentially every computer on the planet could participate. Thus, all the work required in a reliable connection is distributed only to the two end nodes of that connection, while intermediate nodes route packets without keeping any information about the individual packets they transfer.

In "*Reliable Communication in Overlay Networks*," Yair Amir and Claudiu Danilov., in the Proceedings of the IEEE International Conference on Dependable Systems and Networks (DSN03), San Francisco, June 2003, which is hereby incorporated by reference in its entirety, (Yair Amir, a co-author of the paper and co-inventor of the instant application), describe a MOON that uses hop-by-hop reliability to reduce overlay routing overhead and achieves better performance than standard end-to-end TCP connections deployed on the same overlay network. More specifically, in the disclosed MOON, intermediate overlay nodes handle reliability and congestion control only for the links to their immediate neighbors and do not keep any state for individual flows in the system. Packets are forwarded and acknowledged per link, regardless of their originator. This implementation of MOON recovers the losses only on the overlay hop on which they occurred, localizing the congestion and enabling faster recovery. Since an overlay link has a lower delay compared to an end-to-end connection that traverses multiple hops, the losses can be detected faster and the missed packet can be resent locally. Moreover, the congestion control on the overlay link can increase the congestion window back faster than an end-to-end connection, as it has a smaller round-trip time. Hopby-hop reliability involves buffers and processing in the intermediate overlay nodes. The overlay nodes deploy a reliable protocol, and keep track of packets, acknowledgments and congestion control, in addition to their regular routing functionality, thereby allowing for identification of congestions the overlay network level.

In "*An Overlay Architecture foe High Quality VoIP Streams*,", Yair Amir, Claudiu Danilov, Stuart Goose, David Hedqvist, Andreas Terzis, in the IEEE Transactions on Multimedia, 8(6), pages 1250-1262, December 2006, (referred to as [ADGHT06]) which is hereby incorporated by reference in its entirety, algorithms and protocols are disclosed that implement localized packet loss recovery and rapid rerouting in the event of network failures in order to improve performance in VoIP applications that use UDP to transfer data. The algorithms are deployed on the routers of an application-level overlay network and have shown to yield voice quality on par with the PSTN. Similar ideas were expressed in "1-800-OVERLAYS: Using Overlay Networks to improve VoIP quality" with the same authors in the Proceedings of the International Workshop on Network and Operating Systems Support for Digital Audio and Video (NOSSDAV) pages 51-56, Skamania, Wash., 2005 (referred to as [ADGHT05]).

One exemplary Message-Oriented Overlay Network is implemented as the Spines system (www.spines.org), which is available as open source, including messaging services similar to those provided at the Internet level such as reliable and unreliable unicast, but with lower latency. It also includes services not practically available at the Internet level such as soft real time unicast and semi-reliable multicast. The Spines system relates to the use of overlay networks to deliver multimedia traffic in real time. It supports multiple flows, each of which with its own set of senders and receivers, over a single overlay network. Spines does not support multiple overlay networks.

In "*Resilient Overlay Networks*", David G. Andersen, Hari Balakrishnan, M. Frans Kaashoek and Robert Morris in Proceedings of the ACM SOSP, 2001, describe the Resilient Overlay Network (RON) technology. RON is another example of Message Oriented Overlay Network. It provides better connectivity (more resilient routing) by continuously monitoring each overlay site to each other overlay site connectivity. If there is direct connectivity on the underlying network (the Internet in the case of RON) then the message is sent directly using a single overlay hop. Otherwise, RON uses two overlay hops to pass messages between overlay sites that are not connected directly by the Internet, thus providing better connectivity between its sites then the connectivity achieved by the native Internet.

Existing message-oriented overlay networks, however, have some significant limitations. Existing MOONs are architecturally limited such that every overlay node will correspond to only one computer. This means that the capacity through that overlay node is limited to what that computer can do, and the availability of that node is limited to the reliability of that single computer. Moreover, the capacity problem is exacerbated because message processing at the overlay level is typically compute intensive. The current invention shows how to solve this limitation.

Broadband network services are being rapidly deployed around the world to serve the data transfer needs in residential, commercial, industrial, as well as government and military applications. With the availability of rich media content on the Internet, new channels are becoming available for mass media content distribution, with or without interactivity. Many of the traditional TV contents and many new video contents are now being regularly distributed and streamed over IP networks. The same content is distributed to and received by a large number of receiver nodes. However, at the present time, the Internet does not support distribution of live high definition content over a large number of channels directed to groups of content users. This is because the Internet does not practically support native multicast at the network level. Regional, semi-private broadband networks operated by a single service provider have implemented proprietary technology in network applications that can benefit such network multicast as IP multicast. However, such proprietary networks serve a limited number of users and cannot be applied for delivery of content on a global basis without significant infrastructure investment.

Application-layer multicast (ALM), referred in this document also as overlay multicast, has been implemented in overlay networks to provide multicast at the application layer. The principle of ALM is to route and forward multicast data using software running in host nodes (in terms of the underlying network). The multicast data are tunneled through the underlying Internet using unicast transmission, and the participating host nodes replicate and forward these multicast data to other host nodes in the overlay network until the messages reach the destined receiver nodes.

A known ALM protocol is the NICE protocol proposed by Banerjee et al. in "Scalable application layer multicast," in: Proceedings of ACM SIGCOMM, August 2002. NICE is a tree-based ALM protocol where peers are arranged hierarchically such that every peer receives data from its parent or siblings and forwards the data to its children and siblings. This protocol has been shown to work well in many applications and networks due to its proximity-aware feature and its capability to dynamically adapt the overlay network topology to the changing network conditions.

In a publication titled "*Parallel overlays for high data-rate multicast data transfer*" which became publicly available on line on May 2006, and later published in Computer Networks The International Journal of Computer and Telecommunications Networking, Vol 51, issue 1, pages 31-42, K. K. To and Jack Y. B. Lee of Department of Information Engineering, of the Chinese University of Hong Kong, disclosed extending the NICE protocol to use multiple parallel overlays in the same ALM session to spread the data traffic across more available network links in video content distribution applications. More specifically, a parallelized version of the NICE protocol, P-NICE, separates a single data stream into multiple sub-streams, and then send each sub-stream over an independent multicast overlay network without any coordination between the parallel overlay networks. More specifically, in each ALM session, k overlays are built independently using the NICE protocol. Each peer is then sub-divided into k virtual peers (VP), with each virtual peer joining a different NICE overlay. To transmit data, the sending peer first packetizes data into packets of size Pk bytes and then distributes them to the virtual peers in a round-robin manner. The virtual peers in turn send them over the k NICE overlays independently. To receive data, the virtual peers of the receiving peer first receives the packets from the overlays, and then resequences them in the proper order before passing them to the application. Different overlays route data over disjointed links to utilize the available network capacity, and high-capacity links are utilized by routing multiple overlays through them.

The main drawback of constructing k overlays for the same ALM session is the increased control overheads. In the original NICE protocol, peer overlay nodes of each parallel overlay continue to probe each other periodically to monitor any changes in the parallel overlay network conditions in response to which overlay topology is rearranged to improve performance. Each rearranged topology triggers additional topology rearrangements causing a positive feedback loop that can destabilize the network. Prior art attempt try to decrease trigger sensitivity to provide more stability. K. K. To et al. suggest reducing control overheads through sharing measurement information across multiple overlays without specifying how such measurement information is shared. K. K. To et al. also suggest splitting the measurement tasks between the multiple overlays to further reduce control overheads and developing intelligent ways to control and optimize the number of deployed overlays and dynamically adapt the number in response to changing network conditions to improve throughput. The work described in the paper is limited to a single stream (flow) and does not describe supporting multiple flows with different sources and destination sets.

There remains a significant need in the art to provide a managed but widely distributed network capable of transporting and delivering any group of high quality live flows such that each flow has potentially different source and different destination set, at a truly global scale, thus allowing content providers to maintain control over the distribution of their live content. Further, this content needs to be delivered with minimal latency, consistently high quality, with high reliability, and at an attractive cost. With the advances in power of processing units, there exists a commensurate need for a system, method or protocol for scaling reliable real-time or near real time delivery of large amounts of data, such as Standard Definition (SD) and High Definition (HD) video data, as well as interactivity, for example, in video or online gaming, applications. What is needed is a network that supports any-to-any high quality live flows at global scale delivered with high reliability at attractive economics.

SUMMARY

Briefly, various aspects of the system and method disclosed herein support delivery and transport of flows to destination nodes over parallel overlay networks. Overlay nodes executing overlay processes create and maintain one or more overlay networks. A plurality of sites are connected to each other via the parallel overlay networks with each site comprising one or more transit routers that route the flows to the destination nodes.

DETAILED DESCRIPTION OF THE INVENTION

Figure 1:
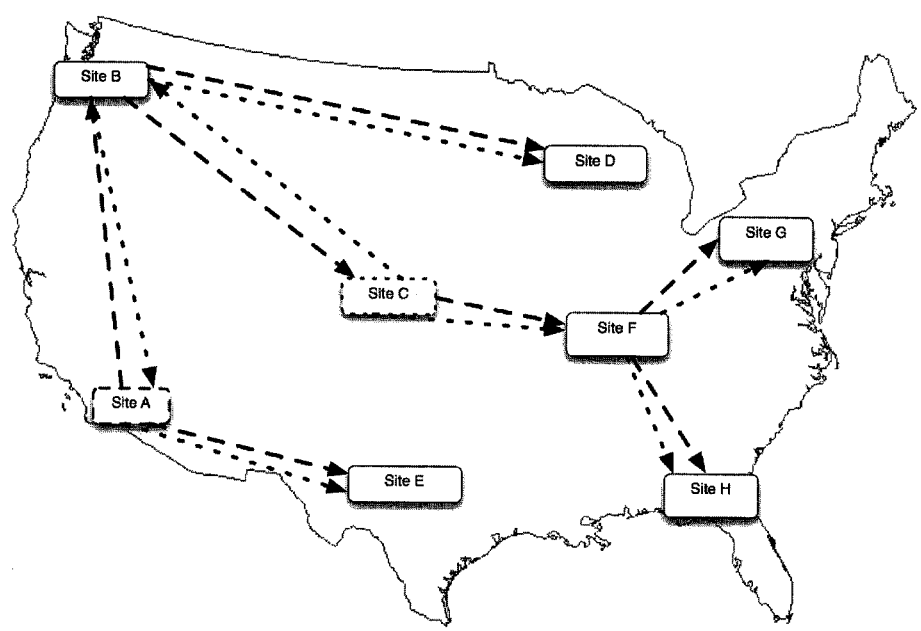
FIG. 1 shows locations of a number of sites on with flows having the same receiving sites.

The present invention is implemented with application-level overlay networks comprising a plurality of parallel overlay networks that are applied over an underlying network of nodes, for example an IP network, such as the Internet. The present invention is described herein according to the following definitions:

Definitions

A process is an algorithm or method executed in a processing unit. A state information is any information that a processes receives for performing a task or produces by performing a task.

A global state information is any state information that is shared with processes in more than one site.

A real-time process is a process that is executed to complete tasks before a specified deadline.

A processing unit is the basic unit of computation provided by a CPU that can execute independent IO and computation tasks. For example, in a multi-core CPU it would be a core, in a single-core CPU it would be the CPU itself. Hardware threading, such as Intel Nehalem HyperThreads or Sun SPARC T2 hardware threads can be processing units.

A node comprises one or more processing units running processes that perform I/O functions for sending and receiving flows.

A flow is a series of related packets communicated amongst a source node and one or more receiver node(s).

A live flow is a flow that reaches each receiver node within a defined delay budget.

A receiver node is a node that executes a process for receiving flows.

A source node is a node that executes a process for sending flows.

A site comprises a location for a group of nodes that communicate with each other over an intra-site network, such as a local area network, and have access to an inter-site network, such as the Internet. In one embodiment, nodes are located at geographically dispersed sites.

An overlay node is a logical node that executes an overlay process.

An overlay process is a process that creates and maintains an overlay network and the flows within it according to an overlay protocol.

A shadow overlay process is a type of overlay process used to provide hot backup for a corresponding overlay process. The shadow overlay process executes the overlay protocol as if it were the corresponding overlay process when that overlay process fails.

A protocol is a set of conventions governing the treatment or the formatting of data in an electronic communications system.

An overlay protocol is a protocol for controlling flows between at least two overlay processes based on a defined policy that relates to connectivity, routing of flows and/or communicating messages in an overlay network. The overlay protocols in different overlay networks can be based on the same or different policies.

A logical link comprises a path formed along multiple physical links connecting the nodes of the underlying network.

An overlay network is a network of overlay processes executing on overlay nodes connected to each other by logical (or virtual) links in a computer network that is built on top of an underlying network of nodes.

A multicast network is a network that uses a multicast protocol that copies a flow from a source node to a plurality of destination nodes only in those interim nodes where a logical link to at least two destination nodes splits.

An overlay multicast network is an overlay network that uses less than or equal network bandwidth to deliver the flows from a source node to a plurality of destination nodes than would be required if using only a unicast protocol between the source and each of the destination nodes.

A message is any information that is communicated with a node. A message can be part of a flow or independent from it, such as a control message that is not part of a flow.

A Message Oriented Overlay Network (MOON) is a specific type of overlay network having overlay nodes that execute a MOON process. A MOON maintains control and management over the overlay nodes based on communicated messages. A MOON does not use persistent storage to store data messages during transit.

A MOON process is an overlay process that controls or otherwise manipulates messages passing through the overlay network to improve message service characteristics such as reliability, latency, jitter, recovery protocols, reordering, timing or other network properties, or to add new network capabilities or services. A MOON process stores messages during transit in system memory.

A transit router (TR) is a node that executes one or more overlay processes that create and maintain one or more overlay networks. One example of a TR is a server class computer that has one or more processing units. Another example is a dedicated routing device that runs software programs.

An access node (AN) is a node that executes AN processes using one or more processing units to receive flows and send flows to overlay nodes as well as delivering those flows to destination nodes and ingesting those flows from source nodes, which establish connections to the AN. One example of an AN is a server class computer.

A super node (SN) is a logical node made up of one or more transit routers in a single site that acts as an overlay node participant on parallel overlay networks.

Parallel overlay networks are a plurality of overlay networks such that each two overlay networks share the majority of sites they run on.

An operating system (OS) is a computer program executed in one or more processing units that is responsible for the management and coordination of activities and the sharing of resources. OS instances can be executed in different hardware, in different Virtual Machines, or both.

A group communication service (GCS) is a message service that provides Virtual Synchrony semantics, as disclosed by K. Birman and T. Joseph in "*Exploiting Virtual Synchrony in Distributed Systems*", in Proceedings of the ACM Symposium on Operating Systems Principles, pages 123-138, November 1987, or one of its derivatives, such as Extended Virtual Synchrony, by L. E. Moser, Y. Amir, P. M. Melliar-Smith and D. A. Agrawal, "*Extended Virtual Synchrony*", in Proceedings of the IEEE International Conference on Distributed Computing Systems, pages 56-65, June 1994.

System Overview

The system and method of the present invention reliably delivers large numbers of live or non-live flows (or streams) from any source node to multiple receiver (or destination) nodes via a relatively small number of sites at locations in a large geographic area.

FIG. 1 shows the locations of a number of sites on the map of the United States. The sites can be located over areas in any continent, country, state or region. In one embodiment, the sites are located in geographically distinct locations selected according to criteria described in [ADGHT05] and [ADGHT06] mentioned above. For live flows, such budgeted delay can be about 100 ms. Each site has one or more connections to a public network such as the Internet, through connectivity provided by network service providers. One embodiment of the invention is implemented in two or more (e.g., three sites) ingress and egress sites for ingest, transport, and delivery of flows.

In one example deployment, each site is situated so that its direct neighbors on the overlay network are about 10 ms away. As shown in [ADGHT06] such settings are good for recovery quick enough to meet needed delay. For example, a deployment with good connectivity with about 15 to 20 sites should provide good enough coverage that allows delivering flows with reliability acceptable to live TV service, with end to end delay of about 100 ms from anywhere to anywhere in the continental US. A world-wide network, while needing a slightly higher latency budget can be covered using the same method by about 50-100 sites.

Each flow is identifiable and can be a point-to-point flow (e.g., from a source node to a destination node), a point-to-multi-point flow (e.g., a multicast flow from a source node to multiple destination nodes), or a multipoint-to-multipoint flow (e.g. an online game). In one embodiment, the present invention is a managed overlay network architecture that supports the transport and delivery of a large number of live flows from any source to any destination over any network, such as an IP network, on a global scale. The architecture allows a content provider to deliver live flows uniquely to a large number of receiver nodes only when a receiver node specifically requests it.

The framework upon which the parallel overlay networks are built includes intelligence for managing flows (live or non-live) with a large aggregate amount of throughput over a distributed architecture comprising a relatively small number of sites, each of which with one or more transit routers. The framework also maintains high quality and original fidelity of live flows while maintaining low end-to-end latency under a variety of underlying network conditions. Further, the framework allows for high reliability of the live flows through intelligence that recovers packets (due to, for example, link flaws or failures) within a small latency budget. Error recovery protocols are implemented between transit routers with routing algorithms that consider factors such as policy information, bandwidth costs and network conditions. The flow transport in the framework is fault-tolerant.

The framework delivers various levels of control and flexibility to service providers, allowing them to economically deliver any group of flows from any group of sources to any group of destinations at a global scale with high quality and reliability. In one application, the present invention can be used to deliver requested live content by subscribers at any number of destination or client nodes using intelligence for customized hop-by-hop and end-to-end protocols on to the Internet as the underlying network.

Various embodiments and aspects of the system and method of the present invention described herein provide highly reliable, low latency network services over the wide-area Internet. An exemplary network according to the present invention is implemented in a Flow Transport and Delivery Network (FTDN) comprising parallel overly networks. The FTDN is an intelligent, content-aware, highly scalable managed network designed to deliver high quality real-time flows over the Internet such as live video, TV channel and interactive games by supporting many concurrent flows. The FTDN is scalable with the number of high capacity flows. It is also scalable with the number of source nodes and receiver nodes (client nodes) as long as these nodes connect with one of the FTDN sites (preferably a site they can reach with low latency and good connectivity).

Figure 2:
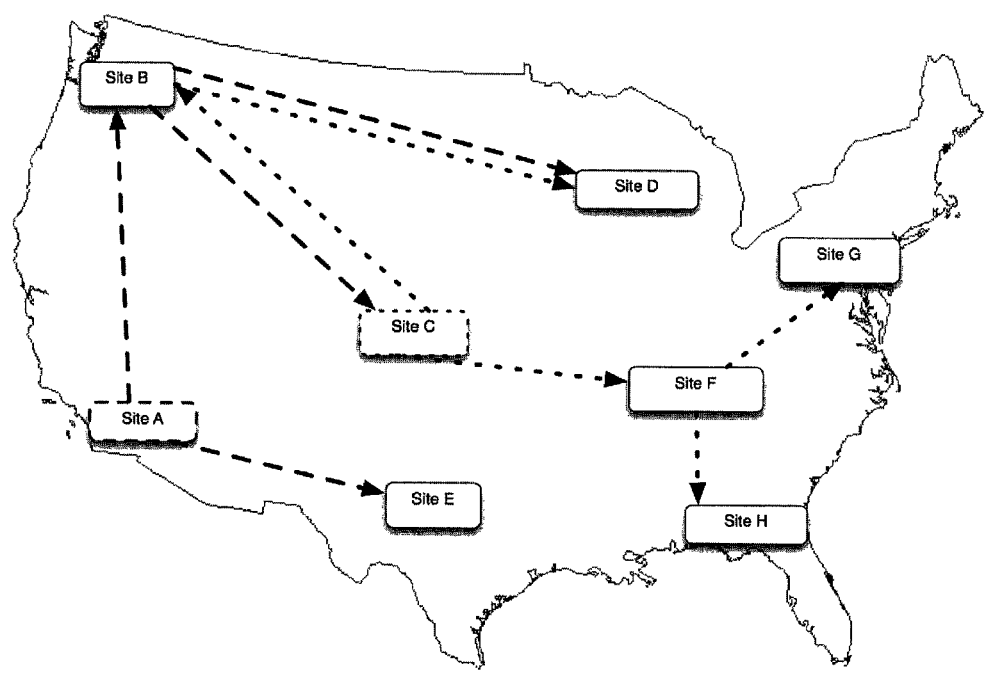
FIG. 2 shows locations of a number of sites having different set of receiving sites.

Each flow can have multiple destination nodes and each source node can have multiple flows. The FTDN could be used to provide high-quality and real-time content, such as Standard Definition (SD) and/or High Definition (HD) video, online game support and other multimedia over the Internet for viewing or distribution to millions of users or subscribers. Two examples of networks for flow delivery according to the present invention are shown in FIGS. 1 and 2 where a network of overlay sites across the USA forward two flows to either all of the sites (for example a popular flow that has viewers everywhere) or a subset of the sites for a less popular or more regionally interesting flows. FIG. 1 shows all sites receiving all the flows. FIG. 2 shows each flow having different set of receiving sites, with some sites receiving both flows. In both cases, links between sites are determined by site connectivity and do not vary with flows and the communications costs are shared symmetrically between the sites.

Network Architecture

A generic architecture for scalable, highly available, globally optimized message-oriented overlay networks according to the present invention uses several techniques for distribution of a large number of live or non-live flows. Such flows can be high bandwidth flows, e.g. for SD and HD video streams, preferably via optimal multicast routing that could be fully reliable or "almost" reliable in recovery of end-to-end errors. The FTDN supports reliable real-time multicast distribution for interactive online games and scales to thousands of flows and millions of subscribers who can view live video flows.

In one embodiment, the architecture scales overlay network technologies so that they can handle a large number of unicast and multicast flows. The large scale is achieved through the utilization of multiple computers that implement each super node in parallel overlay networks as well as the utilization of the modern multi-core processor architecture in these computers, as further described below.

Figure 3:
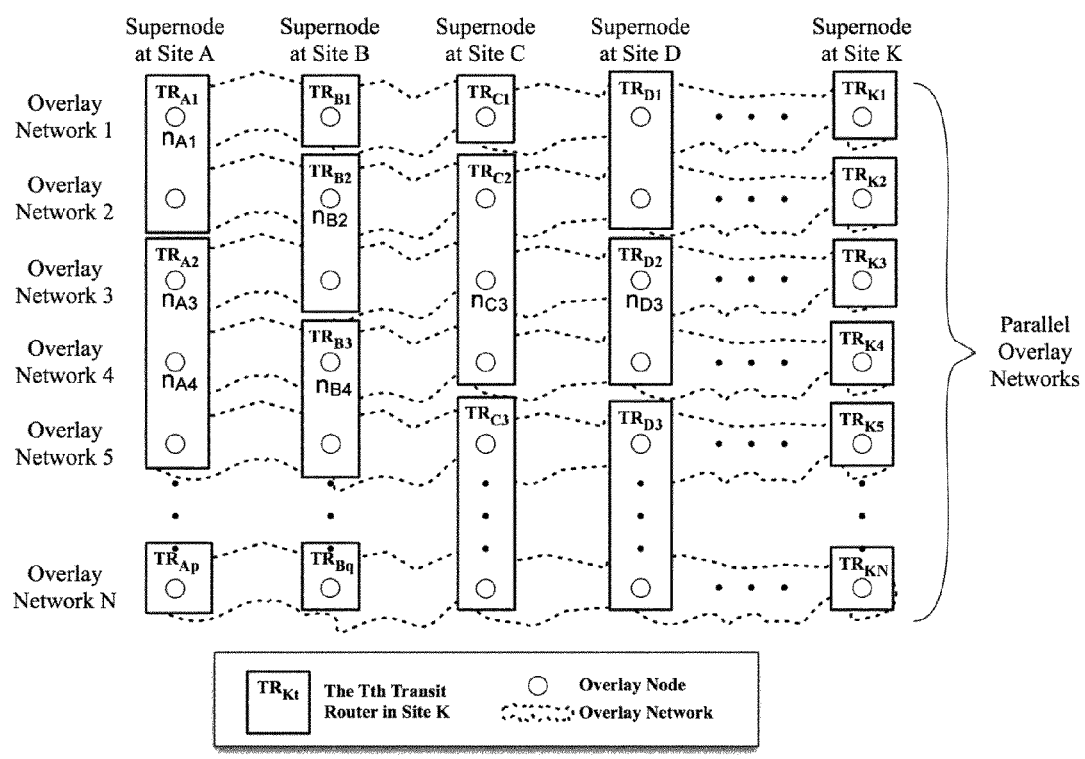
FIG. 3 shows a network architecture diagram of an FTDN according to one embodiment of the invention.

FIG. 3 shows a network architecture diagram of the FTDN that supports parallel overlay networks, shown as rows $ON_1$-$ON_N$, across a plurality of sites, shown as columns A, B, . . . , to K. The FTDN of FIG. 3 comprises a plurality of overlay nodes, $n_{A1}$-$n_{KN}$, at the intersection of each overlay network at each site. In one embodiment of the invention, overlay nodes $n_{A1}$-$n_{KN}$ execute corresponding overlay processes $P_{A1}$-$P_{KN}$ for scalable delivery of multiple flows, via the parallel overlay networks.

As further described below, the plurality of overlay processes can share network resources based on an a-priori known information without communicating with each other. The plurality of overlay processes can also be assigned to resources based on gathered information about link status, resource utilization or a parallel overlay networks' activity.

In one embodiment, the overlay processes are assigned in each node based on shared state information, as further described below. For example, state information associated with a plurality (at least two) of identified flows can be shared between the overlay processes executed in overlay nodes of parallel overlay networks. Such sharing of state information allows for coordination of overlay processes for scalable delivery of multiple flows in parallel overlay networks.

Each overlay network may have different or similar connectivity characteristics with other overlay networks, thus yielding different or similar routing decisions based on defined routing policies. For example, using different routing policies for different overlays with similar sites creates a relatively simple way to provide multi-path routing for fault tolerance and high network throughput purposes. Using similar routing policies for different overlays with similar sites is a relatively simple way to allow high processing costs per message while maintaining high throughput, as further describe below.

Any kind or number of parallel overlay networks, e.g., message oriented or non-message oriented, can be implemented over an underlying network. The parallel overlay networks can be the same or different overlay networks. An exemplary scalable message-oriented overlay network comprises a plurality of MOONs that execute MOON processes. Examples of specific overlay networks that could be used as the MOONs in the FTDN are Spines and RON mentioned above. The underlying network can be any type of public or private network, and can be an IP network or the Internet.

A super node contains one or more transit routers located at a site. A super node acts as an overlay node participant in different overlay networks of the parallel overlay networks. A transit router executes one or more overlay processes that create and maintain one or more overlay networks. As shown in FIG. 3, Site A has p transit routers, such that $TR_{A1}$ contains two overlay nodes, $TR_{A2}$ contains three overlay nodes, etc. Overall, there are N overlay nodes in Site A. On the other hand, Site C has 3 transit routers, namely, $TR_{C1}$, which comprises one overlay node, $TR_{C2}$, which comprises three overlay nodes, and $TR_{C3}$, which comprises the remaining overlay nodes for a total of N overlay nodes in the site. Site K has N transit routers, each of which comprises one overlay node.

Figure 4:
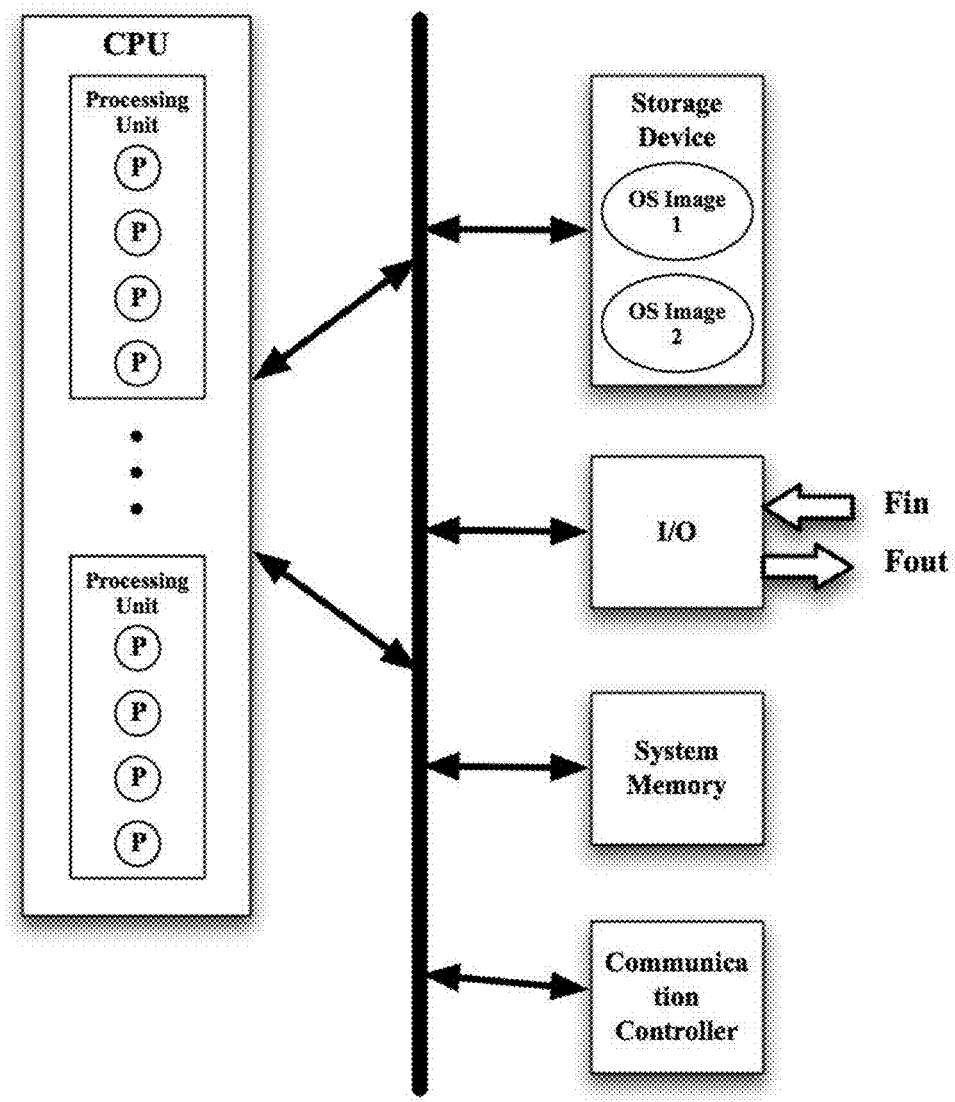
FIG. 4 shows a block diagram of a transit router.

FIG. 4 shows a block diagram of a transit router. The transit router comprises at least one CPU supporting one or more processing units, each executing one or more overlay processes P. The transit router can be implemented by a single core processing unit, a multi-core processing unit or otherwise by a single computer or multiple computers having one or more processing units for executing overlay processes.

In one embodiment, the transit router has a volatile system memory and an I/O interface for receiving flows from other transit routers or access nodes, or transmitting flows to other transit router or access nodes and interfacing with other networks. In another embodiment the transit router also has a persistent storage device.

In order to support interactive and real-time flows, the end-to-end delay and jitter should be minimized. In one embodiment, the transit router forwards flows from an input port to the output port of the I/O interface through the system memory, without storing any part of the flow onto the persistent storage. The transit router may store the flow, or allow another host collocated with it to store the flow, in order to support interactive services such as replay, video capture and clip transmission, or selective frame capture in multimedia applications. It may also require stable storage to support logging for security, audit, or monitoring purposes.

In one example, the transit router operates under the control of a single operating system, e.g., Linux. Alternatively, a number of operating systems, the same or different, e.g., Windows and Linux, or three Linux instances, execute within the transit router as virtual machines, some or all of which executing overlay processes. A communication controller passes various information amongst the overlay processes. One or more overlay processes are allocated to each transit router. Each overlay node is managed by its own process (daemon), thereby allow efficient utilization of multi-core, multi-processor modern computer architectures. This increases the throughput potential of the super node overall collection of overlay processes while allowing for relatively high average computation expense per message flowing through each overlay network without incurring harmful delay. The ability to expend relatively high computation expense per message going through the parallel overlay networks on every hop, enables the optimization of network performance for high throughput, high reliability and low latency. Examples include hop-by-hop recovery, coding, etc.

This architecture is in contrast to the common practice of using a large number of threads within the same process in order to utilize multi-core processor architecture. Executing separate overlay processes in the one or more transit routers provides strong separation, protection against side effects between the different overlays, and improves fault independence. Such a programming approach is also much simpler than a large-scale multi-threaded approach and fits both the multi-core hardware and the intrinsic nature of the problem with a large number of different separate flows. The architecture of the present invention also supports the use of virtualization to utilize multi-core processors by instantiating several virtual machines on each physical machine, such that the overlay nodes running on a physical machine can be divided between the virtual nodes.

Some client nodes can run under the control of senders of flows e.g., content providers, and others under the control of receivers of flows, e.g., subscribers. The membership of each flow can be dynamically updated as the set of sites that need to receive each flow changes. Upon such a change, the optimal dissemination graph is recalculated dynamically on the fly. In one embodiment, the FTDN manages layer 5 to layer 7 of application level traffic flows. The FTDN is aware of all of the flows and the network by keeping and managing the state of every flow in a closely monitored manner. FTDN is also aware of the underlying network conditions allowing it to route around problematic links. Flows from any source can be delivered to any subset receivers, enabling segmented service. FTDN maintains end-to-end control over the flow and supports policy, cost and utilization based flow admission control.

In one embodiment, in contrast to providing a "fair" service, the FTDN provides service within its current capacity in terms of available bandwidth and processing power, and flow priorities. When resources are too scarce to meet high quality requirements of all flows flowing over the parallel overlay networks, admission control limits low priority flows that require scarce resources. For example, this is accomplished by maintaining and sharing information regarding the required throughput for each flow and its overlay site membership, the processing capacity of each overlay and the available overlays, and the currently available bandwidth capacity in each site.

State Management

All of the transit routers share knowledge of the state of flows through the entire overlay network. In one embodiment, each super node sends state update packets to each of its neighboring super nodes to inform them of changes to its local connectivity, changes to any local link costs, and a list of which flows this site has local receivers for. The Transit Routers within a site share additional state information with each other through a local network. This state information includes which transit routers are responsible for handling each overlay network.

According to one embodiment of the invention, a communication controller shares state information amongst a plurality of the overlay processes. The communication controller can comprise one or more communications processes executed by transit routers. The communication controller can share the state information by providing access to state information that is shared between the overlay processes.

As described later, a coordinator process makes certain determinations regarding coordination of the multiple flows locally in the transit router based on global state information. Such determination can relates to admission of a flow to an overlay network, allocating an overlay network to an overlay process or allocating an overlay process to a node. The admission of a flow to an overlay network can also be based on a priority information.

As stated above, in one embodiment, the shared state information can be associated with a plurality of identified flows. In another embodiment, the transit router node replicates state information of one overlay process that maintains an overlay network by pushing the information to be shared by at least one other overlay network process that maintains another overlay network. In still another embodiment of the invention, a group communication controller replicates state information amongst these overlay processes. The group communication system can receive global state information from an overlay process running in another transit router associated with the parallel overlay networks. Multiple overlay nodes can share the same instance of the group communication service. For example, there can be a single group communication instance (e.g. a Spread daemon) for each transit router, a single instance for the whole super node, or even (in principle) a single instance for the whole parallel overlay networks. A group communication service instance can coordinate replication of state information in multiple super nodes. Alternatively, each super node may have multiple group communication participants in a global group communication service instance.

Figure 5:
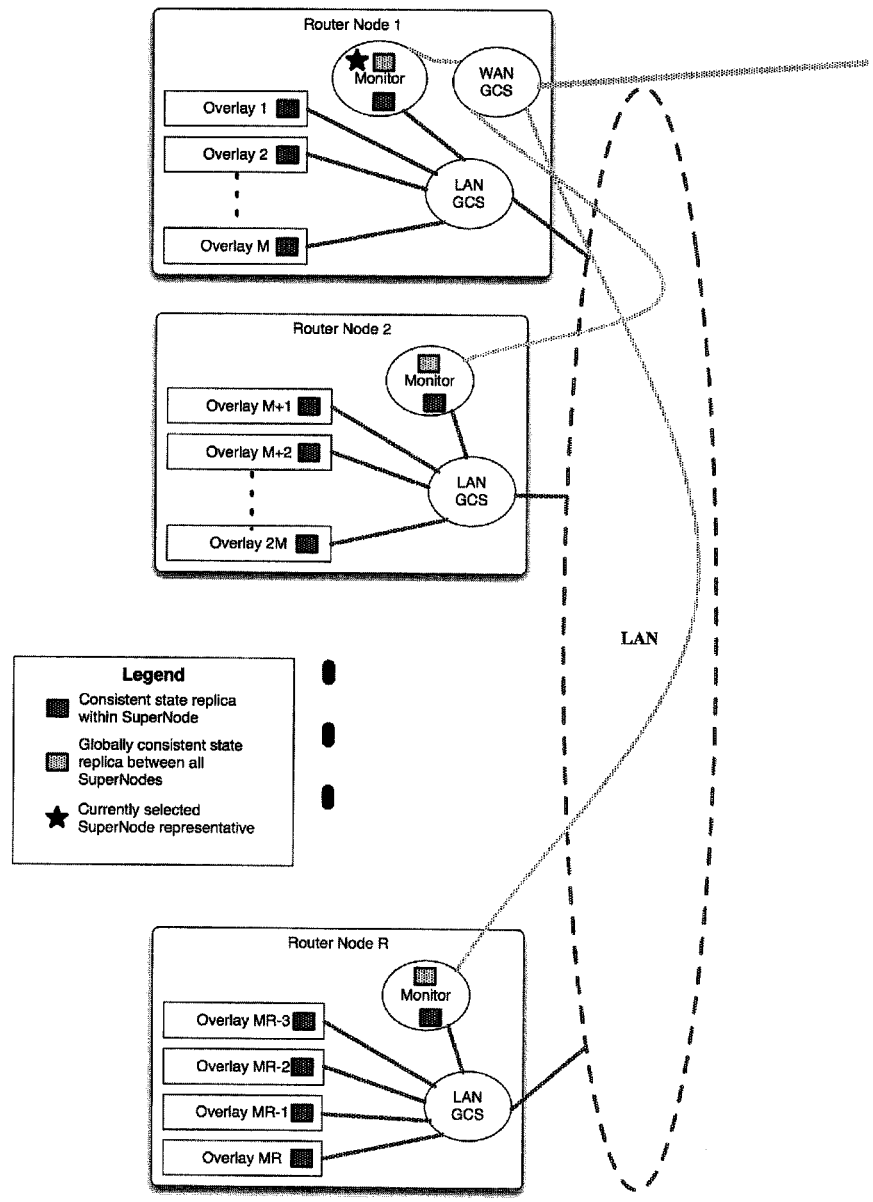
FIG. 5 shows the block diagram of a super node.

FIG. 5 presents an example in which each super node has a single group communication service instance, with each transit router as a participant (LAN-GCS), and another, global, group communication service instance between the sites, with a representative transit router from each site as a participant. In this example, if the representative fails, another representative from the local site takes its place. This is simple to implement based on the virtual synchrony semantics and failure notification of group communication services (e.g. Spread).

In yet another embodiment, state information can be shared over operating system boundaries of one or more transit routers. According to this embodiment, the FTDN has one or more processing units that run a first overlay process under the control of a first operating system to perform a function in a first overlay network. A second overlay process under the control of a second operating system performs a function in a second overlay network. The first overlay network and second overlay network comprise a parallel overlay networks with a plurality of overlay nodes. Under this arrangement, the communication controller provides access to state information that is shared between the first overlay network process that maintains a first overlay network and the second overlay network process that maintains a second overlay network. The first operating system can be different from the second operating system. One overlay node can be executed per overlay process in each of the operating systems. One overlay node can also be executed per overlay process in a Virtual Machine.

FIG. 5 shows the block diagram of a super node. A super node contains a collection of physical nodes (e.g., computers or other processing units), each with a number of CPUs, each CPU with a number of cores, and potentially, each core with a number of hardware threads, for example, those defined by Sun Microsystems. Exemplary router nodes may be constructed of standard server class computers with a CPU, memory, and network interfaces. In one exemplary embodiment of the invention, the routers may also be dedicated routing devices running software programs.

The super nodes are connected by a network. Each super node has one or more transit routers, shown in FIG. 5 as Router Nodes 1-R. Each transit router comprises one or more overly nodes, (for example, shown as Overlay 1-M in Overlay Node 1), formed by executing overlay processes. Each of the overlay processes is dynamically allocated to a single transit routers at any time for routing unicast and/or multicast data messages to receiver nodes over parallel overlay networks, preferably, with various levels of reliability for delivering such messages, as described further below. Each transit router executes overlay processes with one or more processing units, such as one or more cores, to create and maintain two or more parallel overlay networks. A communication controller shares data between the transit routers within a site via an intra-site network, such as a local area network. An inter-site network, such as the Internet, connects all of the sites to the receiver nodes.

FIG. 5 also depicts sharing state information relevant to the plurality of parallel networks overlays within the super node by dark squares. State information is shared between the different overlays using a site-based group communication system while a global wide area state information (shown in light square) is maintained using a wide-area instance of the group communication system that spans other super nodes in different sites. In one embodiment, the group communication service is a communication service offered by the Spread toolkit, which allows for separate configuration of communications amongst nodes. The group communication toolkit can be configured differently for each instance of the GCS, depending on the need for scalability and performance (especially latency and fault detection). Other possible setups can have a different number of nodes participating in the global, wide area group communication configuration, with varying fault tolerance and scalability properties. In the extreme, all state information can be shared globally such that there will be no separation between state local to the super node and global state.

In one embodiment, each super node consists of one or more transit routers and one or more access nodes. Each access node receives flows from, and sends flows to, each overlay network through a transit router executing a process that maintains that overlay network. An access node delivers those flows to remote destination nodes that establish connections to the access node. When a client node connects to an access node, a short handshaking protocol exchange establishes a shared state between the access node and the client node. This shared state includes what port numbers they are communicating on, flow control settings, available buffer space, choice of reliability protocol, and an identifier for the client session. The transit router and access node can be instantiated on a single machine or can be split among many machines, each separately performing the functions of a transit router, an access node, or both.

Figure 6:
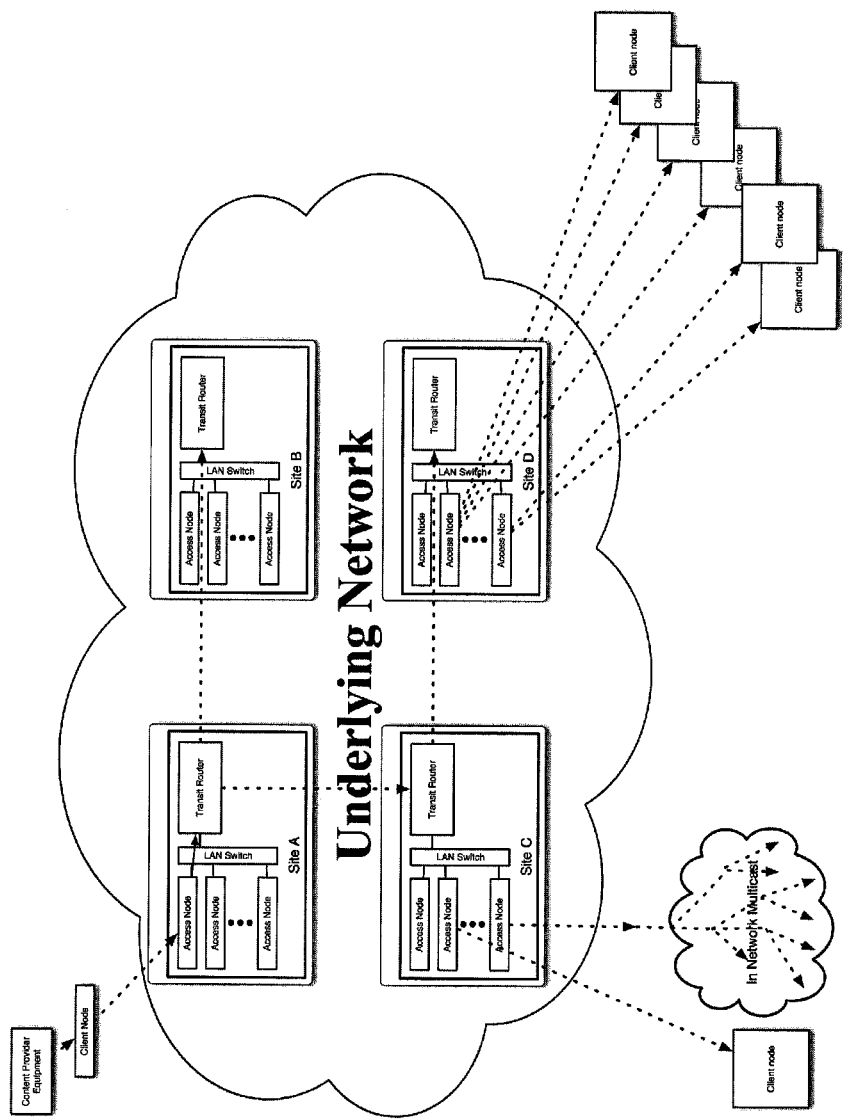
FIG. 6 shows the block diagram of plurality super nodes in corresponding sites.

FIG. 6 shows the block diagram of plurality super nodes in corresponding sites forming a backbone network for delivery of flows from one or more source nodes (content providers) to one or more receiver nodes (clients). The transit routers have coordinating software between them that keeps state of every flow and does routing, resource assignment, network monitoring and admission control. Access nodes aggregate ingestion and delivery points and connect to transit routers communicating with each other, for example, via a multicast protocol over distributed nodes interconnected with IP clouds. In one embodiment, each transit router is an overlay multicast router that manages multicast flows not as IP-Multicast groups, or SSM sender identified groups, but rather as dynamic groups. Each transit router tracks each flow as a separate multicast group and forwards that flow onto additional transit router downstream according to the sender-based multicast routing tree computed by all of the nodes. In one embodiment, each group sender has its own optimal dissemination graph. The routes computed by each transit router is either the same or will become the same within a small window of time as each transit router calculates the routes based on link-state information provided by all of the other routers. This type of full route calculation is feasible because it is only carried out by the relatively small (e.g., thousand or less, and, in one embodiment, just 100 for a global world-wide coverage) number of super nodes, and not by all of the underlying Internet routers over which the flows may pass.

In one embodiment, the transit router only forwards flows onto other transit routers that either have a local recipient of the flow (through an access node or direct client connection) or if that transit router is along the computed routing path between the current transit router and some other transit router who does have a local client node for the flow.

Figure 7:
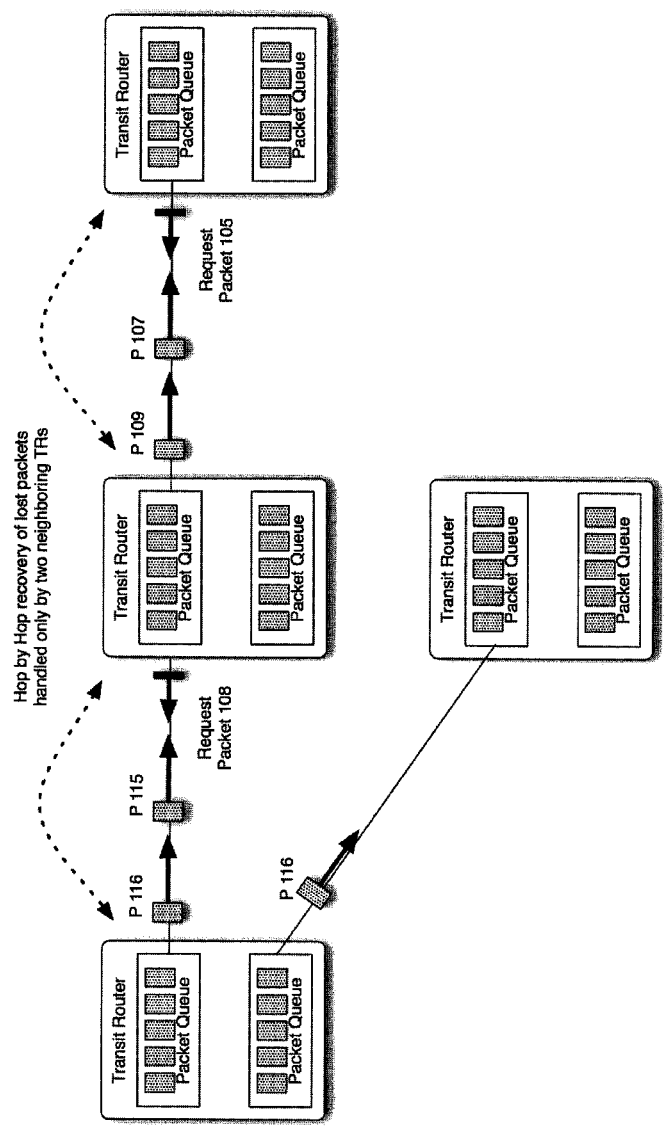
FIG. 7 shows one embodiment of a packet recovery protocol implemented in the FTDN of FIG. 3 or FIG. 6.

FIG. 7 shows one embodiment of a packet recovery protocol implemented in the FTDN. As each flow passes through multiple transit routers, each may provide local recovery of lost or out-of-order packets between itself and the transit routers one hop upstream from them. As shown, packets 108 and 105 are requested because they were lost between two transit routers. Packet 109 is forwarded on to a third transit router even though a previous packet 108 is still being recovered. This out-of-order forwarding prevents the delay caused by convoy effects and cascading losses. Several different algorithms may be used to provide different service levels. Exemplary algorithms include full reliability (even in the case of complete router failures), reliable transport unless a transit router involved in the flow fails, partial reliability where some packet loss is possible but at a much lower rate then the underlying networks' packet loss, and unreliable packet delivery where no additional efforts are made if packets are lost by the underlying network during transit between transit routers.

In one embodiment, the overlay processes uses an overlay protocol that supports recovering a lost packet associated with a flow and reordering said packet after it is recovered. Lost packet can be recovered on a hop-by-hop basis. The overlay processes can also use an overlay protocol that supports recovery of lost packets associated with multiple flows over one hop upstream from another overlay node. Alternatively, the overlay protocol can either not support any packet recovery, recovery of some lost packets or support reliable message transport.

Figure 8:
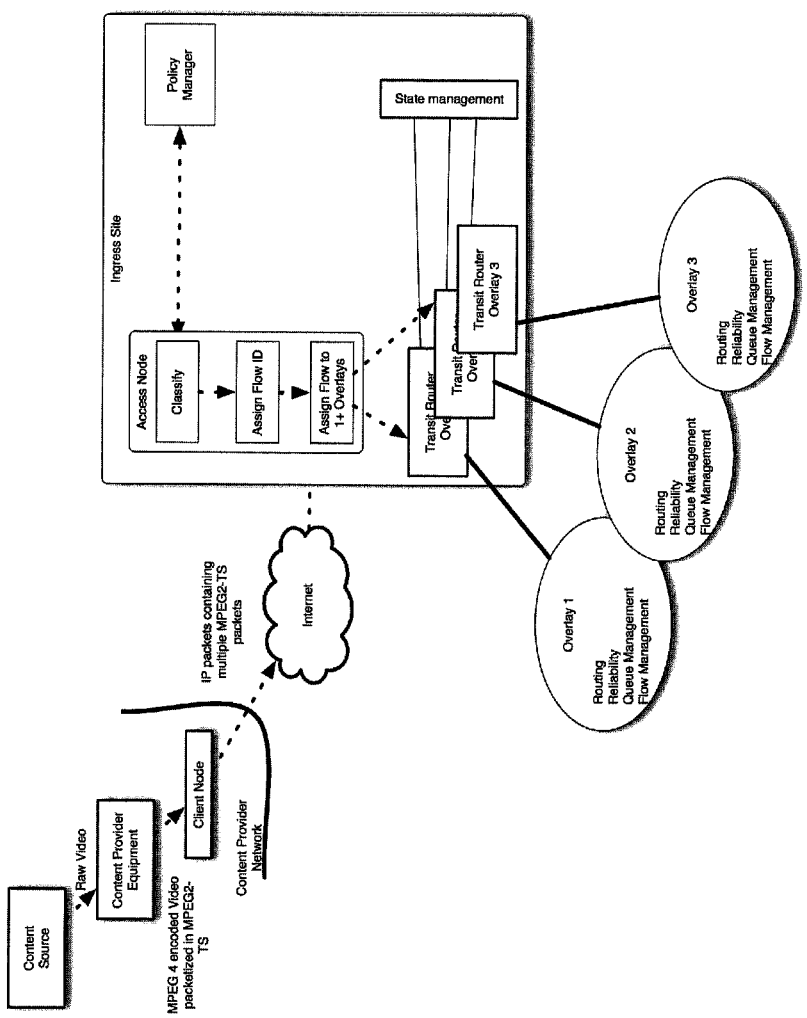
FIG. 8 shows the block diagram of one embodiment of an ingress site.

FIG. 8 shows the block diagram of one embodiment of an ingress site that receives content from a service provider. The site comprises one or more access nodes that receive one or more live flows, e.g., game or video flows, from a content source node, for example, via the Internet. The source node can be any type of a client node that is under the control of the service provider. The access nodes classify the live flows according to one or more routing polices defined by a policy management block. Once classified, the access nodes assign IDs to the live flows. Each flow ID is assigned to one of a plurality of parallel overlay networks. Each overlay network has an overlay node in one or more transit routers located in the ingress site. A state management block in the ingress site coordinates the sharing of state information within the one or more transit routers of the ingress site and those in other sites.

Figure 9:
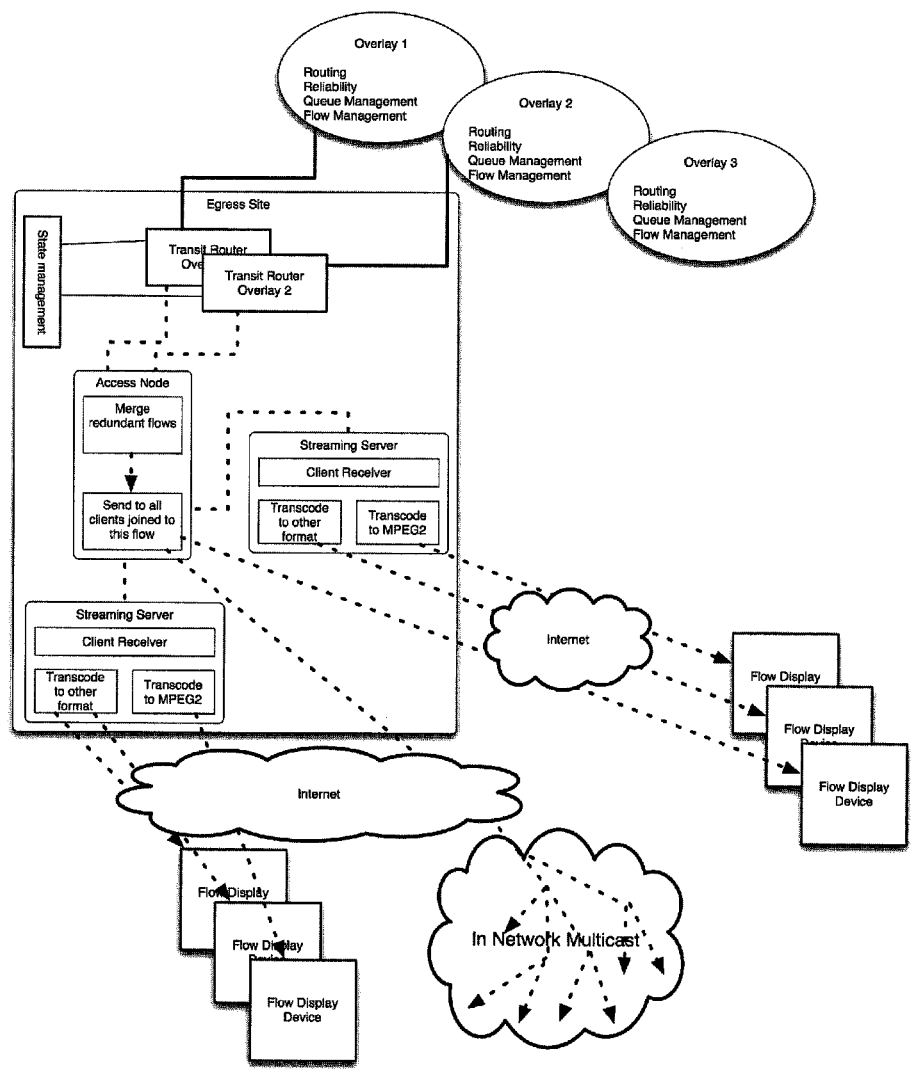
FIG. 9 shows the block diagram of an egress site.

FIG. 9 shows the block diagram of an egress site that delivers content to subscribers at destination client nodes. The live flows received over the plurality of parallel overlay networks at corresponding overlay nodes of one or more transit routers located at the egress site. Another state management block in the ingress site coordinates the sharing of state information within the one or more transit routers of the egress site and those in other sites. One or more access nodes in the egress site merge redundant flows and send them to client nodes that can join in for receiving the flows in real time. One or more streaming servers convert or transcode the content to various formats supported each receiver node.

Figure 10:
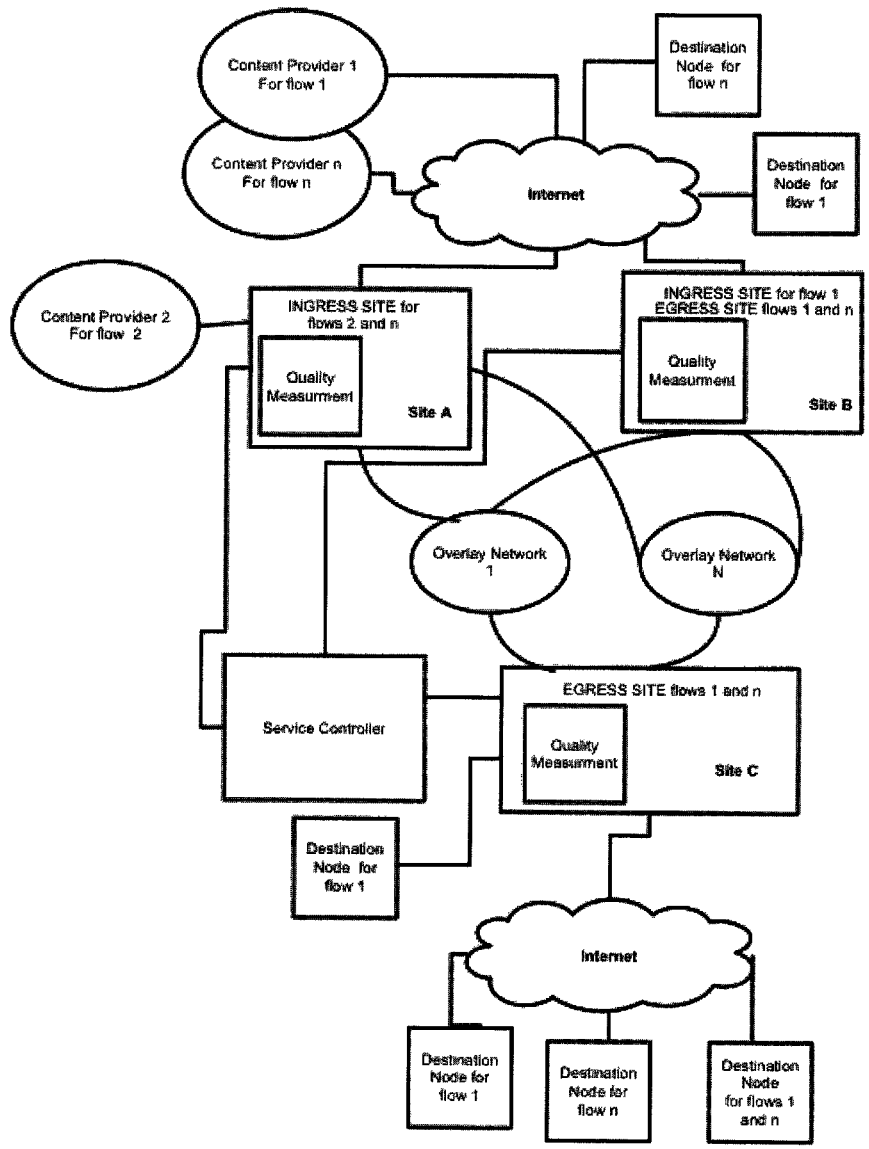
FIG. 10 shows the block diagram of an FTDN according to another embodiment of the invention.

FIG. 10 shows the block diagram of an FTDN for delivery of flows within a network that has one or more destination nodes. The flows are delivered via a plurality of sites such that each flow has a content provider connected (directly or through the Internet) with an ingress site. Each site has at least one transit router with a plurality of overlay nodes executing parallel overlay processes associated with the plurality of overlay networks. Flows are delivered to specific destination nodes through egress sites to which these destination nodes connect (directly or through the Internet). For example, Content Provider 1 with Flow 1 connects through the Internet with Site B, which therefore servers as Flow 1's ingress site. Flow 1 has sites B and C as egress sites: Flow 1 is delivered to one destination node connected with Site B through the Internet, two destination nodes connected with Site C through the Internet and one destination node connected with Site C directly. Similarly, Flow n from Content Provider n has Site A as an ingress site and sites B and C as egress sites: Flow n is delivered to one destination node connected with Site B and two destination nodes connected with Site C, all connected through the Internet. Content Provider 2 with Flow 2 connects directly with Site A, which therefore servers as Flow 2's ingress site. However, currently no destination node is interested in Flow 2 and therefore it has no egress sites and is not flowing on the parallel overlay networks out of site A. The parallel overlay networks use an inter-site network, e.g., the Internet, to deliver each flow from its ingress site to its respective egress sites and from them to one or more destination nodes.

FIG. 10 also shows a service controller that controls the delivery of specific flows to specific destination nodes based on service requests received from the destination nodes. The service requests relate to state information that is shared amongst the overlay processes. The service controller can be distributed or centralized, and is either as part of the FTDN, outside the FTDN, or split such that a component of it is part of the FTDN.

Additionally, content specialized protocols may be used between the transit routers to provide better quality of service, reliability, latency, or jitter control by taking advantage of the routers ability to examine the content of the packets beyond the outermost IP layer. For example, if the flow consists of MPEG-4 encoded video, the reliability protocol may take into account what type of data is in the lost packet. If it consisted of an I-frame then recovery of the packet should be attempted since that is a critical part of the video flow and will disrupt multiple frames of playback if it is lost. However, if a differential P-frame is lost, then recovery may not be as worthwhile as the disruption to video would not be substantial, but delaying playback for recovery would cause a noticeable interruption. The recovery decisions could also take into account whether the lost data was for a portion of the display where data had previously been lost and then spend extra effort recovering it as the loss of data in two sequential frames in the same location would cause an impact on playback, but loss in two different locations could be recovered during playback by extrapolation from previous and next frames.

Therefore, the transit router recovers lost packets based on an attribute associated with a delivered content, wherein set attribute, for example, is an I frame or a P frame of an MPEG content. The service controller supports at least one of interactive services or flow replay.

Global Resource Allocation and Admission Control

The scalable architecture described above provides the means for a consistent global state across the wide area overlay network. Based on this state, global decisions can be made locally in a consistent manner by each overlay node with access to the shared global state, anywhere in the network. Therefore, resource allocation and admission control decisions can be made by each separate overlay node based on their shared global knowledge in a consistent manner without further communication or coordination at the time of the decision and without any extra overhead beyond work required to maintain the global state. A consistent order of events such as in Congruity and the Replicated Hash Table tools can serve to maintain and construct the global consistent state.

Resource allocation and admission control decisions are important especially when resources are scarce. In the case of network problems, resources can become scarce to the point that not all serviced flows can be accommodated at their highest quality level. Utilization information is maintained as part of the global state and this situation become apparent throughout the network. Overlay nodes locally calculate the largest set of flows with the top priority that can be supported. These local calculations will be consistent because the policies, priorities and cost of the various flows will be maintained consistently as part of the global state. Therefore, the FTDN is able to decide dynamically on the fly which flows should be given the resources they need and which flows should be limited or blocked in order to allow the desired level of service for higher priority flows when network resources are not adequate to support all of the flows.

While it is possible to allocate resources so that reduced quality for some flows allows a greater number of flows to be supported when resources are scarce, an admission control decision (go or no-go) for each flow, admitting the largest set of highest priority flows that can be accommodated, allows for the system to be agnostic to the type of data passing in each flow. In contrast, when graceful degradation for flows is desired, reducing a flow bandwidth also requires an end-to-end approach: For example, if a 2 Mbits/sec SD channel cannot get its full 2 Mbits/sec, but can get only 1 Mbits/sec bandwidth, the coding of the channel has to change to trade quality for bandwidth. A clean admission control eliminates the need for such an end-to-end approach as the flow either gets the resources it needs or is not admitted at all.

The architecture can accommodate a wide range of policies and algorithms in order to make the resource allocation and admission control decisions. For example, a cost-benefit framework as described in "*Throughput-Competitive On-line Routing*", by B. Awerbuch, Y. Azar, S. Plotkin in Proceedings of the IEEE Symposium on Foundations of Computer Science (FOCS), 1993, as well as in "*An Opportunity Cost Approach for Job Assignment and Reassignment in a Scalable Computing Cluster*" by Y. Amir, B. Awerbuch, A. Barak, R. S. Borstrom and A. Keren. in the IEEE Transactions on Parallel and Distributed Systems, 11(7), pages 760-768, July 2000, can lead to near-optimal online decisions (without knowing the future).

Another protocol that can be implemented in the FTDN is described in Provisional Application Ser. No. 61/140,065, filed Dec. 22, 2008.

Routing Based on Quality and Bandwidth Cost

The state update information sent between the transit routers can also be used to implement a new form of cost-based overlay routing, where in one embodiment the routes that are calculated are based not only on network resources such as link capacity, latency between sites, or loss on links, but also on the financial cost of the links. In one exemplary embodiment, the routing algorithm computes routes in a deterministic manner at each Transit Router site, so all of the routers determine consistent routes based on the same available information. They can use an algorithm of determining the lowest (financial) cost route that still maintains a minimum level of network quality and latency. A variation of this method would be to have the information not be completely consistent since each transit router may receive updates at different points in time (or different points in the flow). This would result in route calculations that differed for some brief period of time until the new information had fully propagated to all of the transit routers. A second variation would be to use a reliable wave algorithms to calculate the routes. In this type of algorithm each set of state updates is identified with a wave identifier that is strictly increasing. Then each transit router calculates routes once per wave so all traffic routed within a wave will have consistent routing.

In FIG. 10, the FTDN delivers flows through the parallel overlay networks to the one or more destination nodes over a plurality of physical links in the underlying network that are associated with a plurality of bandwidth costs. Some links may be more expensive to deliver flows on and vice versa. Quality measurement nodes executing quality measurement processes are associated with the links and the flows. The flows that are routed through the parallel overlay networks are delivered to the one or more destination nodes over links selected by transit routers based on the bandwidth costs and quality measurements, such as latency, jitter or link reliability. The links can also be selected based on routing weight, available bandwidth or a hop-count. Another approach is to select links to optimize bandwidth cost while ensuring that the routing tree maintains a defined quality measure.

Fault Tolerance

Another feature of the architecture of the FTDN is that it provides high availability and fault tolerance to logical overlay nodes that are implemented by multiple computers, so that the failure of individual computers does not cause a failure in the logical overlay. Fault tolerant techniques are implemented for rerouting of flows upon site or link failure or degradation, error recovery on links, and redundant transit routers and access node equipment that can handle transit router failure while incurring little or no loss.

The architecture also implements a system and method that provides a consistent global state that is shared among the overlay nodes in each local overlay site as well as across all of the sites. Automatic load balancing between individual computers in the overlay site is accomplished based on the consistent global state. The architecture also provides a facility for global resource allocation and admission control decisions that is based on the consistent global state. This approach provides the capability to route many gigabits per second of data within the overlay without hurting the latency of each individual flow and without substantially raising the overhead of overlay management.

Under this embodiment, one or more primary transit router executes one or more overlay processes that are associated with the parallel overlay networks. An exemplary process that can be used is a MOON process. One or more secondary transit router executing a one or more of shadow overlay processes that are identical to one of more of the overlay processes. The state information of the plurality overlay processes is replicated in the plurality of shadow overlay processes. Upon detection of a fault condition in the primary transit router node, the shadow overlay processes takes over and executes the overlay node protocol as if it was the primary.

IP Addressing and Failover:

To enable each overlay node to find its overlay network neighbors on the Internet, it is possible to use an IP address allocation method such that each overlay node has its own IP address and each super node has its own IP address. However, these addresses will be acquired by the operating system of the physical nodes (e.g., router or super node) based on the allocation of overlays to physical nodes. An example of how IP addresses can be covered in such a way is described by the Wackamole system: "*N-Way Fail-Over Infrastructure for Reliable Servers and Routers*" by Y. Amir, R. Caudy, A. Munjal, T. Schlossnagle and C. Tutu in the Proceedings of the IEEE International Conference on Dependable Systems and Networks (DSN03), San Francisco, June 2003.

Advantages:

In an exemplary application, combinations of the various characteristics can be used for large-scale distribution of low latency high defenition interactive video or gaming. One such information distribution system:

Distributes video through a real-time, multi-hop dynamic overlay network;

Does not use persistent storage of the data flows during transit (such as stored files), but is based on the data as a never-ending and transient flow.

Provides global state management such that all the nodes will have knowledge of all of the flows and where they're going. Based on such a global state, distributed admission control decisions can be consistently made.

Manages delay and jitter for a large number of flows and clients, where the sources, groups and receivers sets are constantly and dynamically changing.

Places the intelligence and management of the network at layer 5 to layer 7, rather then the layer 1 to layer 3 in which traditional networks run. In this way, the Overlay acts as an intermediate layer between the applications at the edges of the network and the underlying Internet.

Allows any site/node to act as the originating broadcaster for a flow, and in fact a logical flow may have several originating broadcasters (e.g. in online games). The routing is an optimal graph per flow that is calculated on-the-fly in a distributed manner and is adaptive to network connectivity, current quality of service, bandwidth and node cost, policy considerations, and location of viewers.

Admission control as well as routing decisions can be made based on priority of flows and current network connectivity and conditions.

A similar architecture can be used for large-scale delivery to clients within a metro area.

Responsibility for end-to-end delivery. From the originating source location to the end-user the flow is managed and monitored by the network.

Latency minimized through hop-by-hop recovery.

Some ways that the FTDN is distinguished from other types of distribution networks are:

The FTDN is distinguished from p2p because network routing nodes, not end-user nodes, route traffic.

When compared with other CDN systems, the FTDN provides excellent scalability gains; a node can dynamically join the network and only then information/data is sent directly to where needed. In this way, each recipient can receive a different subset of flows, without having to pay the carrier to have the flows available at all locations all the time. The system combines the economics of mass volume and economies of scale, but with mass customization.

In comparison with other CDNs the method is network based and not storage based, so the network uses an intelligent overlay network to distributed content to all the edges in real time.

The invention also solves problems related to scalability, reliability of data flows, and management of the flows via for example:

- Optimized use of hardware for overlays by efficient use of various multi core processor architectures.
- Optimization of network based on monetary cost and utilization based cost, global admission control by considering the cost of bandwidth/power/space in different locations and optimizing routing and allocations of flows to resources such as CPUs, network interfaces, and paths through the network.
- Computing within the overlay network (instead of at the edges), the cheapest path that maintains a minimum level of quality.
- Modularization of different synchronization and optimization algorithms to make good decisions about routing flows in the overlay network to minimize cost while maintaining quality. A variation of this would be to have the information not be completely consistent since they may receive updates at different points in time (or different points in the flow).
- Reliable wave algorithms (decisions are made based on state information related to that wave).
- Adaptive algorithms change the queuing, scheduling, routing and reliability within and between the overlay nodes in response to changes in the number, type, and priority of flows and the behavior of the underlying network.
- The system is designed to be resilient to networks that are not highly reliable. Resilient against network faults, packet loss, packet reordering, high latency, jitter, fault tolerance to link and node failures.
- Utilizing path management (multi-hop flows) rather then only hop-by-hop management. This includes decisions about routing, flow control, and fault recovery.

Based on the foregoing it would be appreciated that the architecture of the invention can feed flows to anywhere and retrieve them anywhere, delivering each live flow uniquely to a large number of receiver nodes. Any subset of flows can be delivered to any subset of sites. For example, a live flow can be delivered to a subscriber based on an associated receiver node's request with high fidelity (i.e., close to the original quality) and high consistency under a variety of network conditions. The architecture provides for monitoring quality of underlying links and making routing decisions based on quality and bandwidth cost measures. A small number of overlay sites share intelligence for managing a large number of flows over a large number of network elements or large aggregate amount of live flow throughput using a plurality of processing units, e.g., computers. Most valuable flows are admitted at times of scarcity with an error recovery protocol that does not have latency penalty. Flows and node destinations can be added or dropped quickly at scale in terms of sites, site capacity and number of flows. The present invention offers economic advantages for delivery of flows such as live content in terms of capital expenses and operating expenses by using low cost Internet links, intelligent routing decisions based on economics, using multicast to optimize backbone bandwidth, and using low cost hardware in the sites.

The invention claimed is:

1. A network for scalable delivery of multiple flows amongst a plurality of nodes, the network comprising:
    a plurality of overlay nodes, executing a plurality of overlay processes, said plurality of overlay processes managing data delivery via the multiple flows within parallel overlay networks; and
    a communication system that shares state information amongst at least two overlay processes that maintain at least two overlay networks, said state information being associated with at least two identified flows where each of the identified flows comprises a series of related packets communicated amongst a source node and at least one receiver node, wherein the source nodes or at least one of the receiver nodes of the identified flows are different.

2. The network of claim 1, wherein said multiple flows comprise multiple live flows.

3. The network of claim 1, wherein the plurality of overlay processes share a network resource based on an a-priori known information without communicating with each other.

4. The network of claim 1, wherein the plurality of overlay processes are assigned to a network resource based on gathered information about at least one of link status, resource utilization, or a parallel overlay networks' activity.

5. The network of claim 1, wherein the state information is shared between at least two overlay processes that maintain at least two overlay networks using a group communication service.

6. The network of claim 1, wherein the plurality of nodes comprise one or more destination nodes, wherein delivery of a flow to a destination node is in response to at least one service request received from the destination node.

7. The network of claim 1, wherein one or more of the plurality of overlay nodes comprise a dedicated routing device that operates under the control of one or more operating systems.

8. The network of claim 1, wherein the communication system provides access to said state information that is shared between at least two overlay processes that maintain at least two overlay networks.

9. The network of claim 1, wherein the communication system replicates said state information of one overlay process that maintains an overlay network by pushing the said state information to be shared by at least one other overlay process that maintains another overlay network.

10. The network of claim 1, wherein at least one of the overlay processes uses an overlay protocol that supports recovering an out-of-order packet associated with a flow and reordering said out-of-order packet.

11. The network of claim 10, wherein said out-of-order packet is recovered on a hop-by-hop basis.

12. The network of claim 1, wherein at least one of the overlay processes uses an overlay protocol that supports recovery of lost packets associated with the multiple flows over one hop upstream from another overlay node.

13. The network of claim 1, wherein at least one of the overlay processes uses an overlay protocol that does not support packet recovery.

14. The network of claim 1, wherein at least one of the overlay processes uses an overlay protocol that supports recovery of some lost packets.

15. The network of claim 1, wherein at least one of the overlay processes supports reliable message transport.

16. The network of claim 1 further including a service controller that controls at least one of a secure logging service, an audit service, or a flow replay service for a plurality of nodes.

17. The network of claim 1, wherein the communication system shares state information relating to allocated flows to a node amongst a plurality of overlay processes.

18. The network of claim 1 further comprising one or more access nodes.

19. The network of claim 18, wherein at least one of the overlay nodes comprises a transit router that executes the access node.

20. The network of claim 1, wherein the parallel overlay networks are assigned multiple IP addresses, each of which is claimed by an overlay node associated with the parallel overlay networks.

21. The network of claim 1, wherein the communication system shares state information relating to an allocated resource to an overlay node associated with the parallel overlay networks.

22. A network for scalable delivery of multiple flows amongst a plurality of nodes, the network comprising:
a plurality of overlay nodes run over an underlying IP network, executing a plurality of message-oriented overlay network (MOON) processes, said plurality of MOON processes managing data delivery via the multiple flows within parallel overlay networks with three or more sites; and
a communication system that shares state information amongst at least two MOON processes that maintain at least two overlay networks, said state information being associated with at least two identified flows where each of the identified flows comprises a series of related packets communicated amongst a source node and at least one receiver node, wherein the source nodes or at least one of the receiver nodes of the identified flows are different.

23. The network of claim 22, wherein said multiple flows comprise multiple live flows.

24. The network of claim 22, wherein the plurality of overlay processes share a network resource based on an a-priori known information without communicating with each other.

25. The network of claim 22, wherein the plurality of overlay processes are assigned to a network resource based on gathered information about at least one of link status, resource utilization, or a parallel overlay networks' activity.

26. The network of claim 22, wherein the state information is shared between at least two overlay processes that maintain at least two overlay networks using a group communication service.

27. The network of claim 22, wherein the plurality of nodes comprise one or more destination nodes, wherein delivery of a flow to a destination node is in response to at least one service request received from the destination node.

28. The network of claim 22, wherein one or more of the plurality of overlay nodes comprise a dedicated routing device that operates under the control of one or more operating systems.

29. The network of claim 22, wherein the communication system provides access to said state information that is shared between at least two overlay processes that maintain at least two overlay networks.

30. The network of claim 22, wherein the communication system replicates said state information of one overlay process that maintains an overlay network by pushing the said state information to be shared by at least one other overlay process that maintains another overlay network.

31. The network of claim 22, wherein at least one of the overlay processes uses an overlay protocol that supports recovering an out-of-order packet associated with a flow and reordering said out-of-order packet.

32. The network of claim 31, wherein said out-of-order packet is recovered on a hop-by-hop basis.

33. The network of claim 22, wherein at least one of the overlay processes uses an overlay protocol that supports recovery of lost packets associated with the multiple flows over one hop upstream from another overlay node.

34. The network of claim 22, wherein at least one of the overlay processes uses an overlay protocol that does not support packet recovery.

35. The network of claim 22, wherein at least one of the overlay processes uses an overlay protocol that supports recovery of some lost packets.

36. The network of claim 22, wherein at least one of the overlay processes supports reliable message transport.

37. The network of claim 22 further including a service controller that controls at least one of a secure logging service, an audit service, or a flow replay service for a plurality of nodes.

38. The network of claim 22, wherein the communication system shares state information relating to allocated flows to a node amongst a plurality of overlay processes.

39. The network of claim 22 further comprising one or more access nodes.

40. The network of claim 39, wherein at least one of the overlay nodes comprises a transit router that executes the access node.

41. The network of claim 22, wherein the parallel overlay networks are assigned multiple IP addresses, each of which is claimed by an overlay node associated with the parallel overlay networks.

42. The network of claim 22, wherein the communication system shares state information relating to an allocated resource to an overlay node associated with the parallel overlay networks.

43. A transit router that routes multiple flows within a network having a plurality of nodes, the transit router comprising:
one or more processing units, said one or more processing units running one or more overlay processes associated with parallel overlay networks; and
a communication system that shares state information amongst at least two overlay processes that maintain at least two overlay networks, said state information being associated with at least two identified flows where each of the identified flows comprises a series of related packets communicated amongst a source node and at least one receiver node, wherein the source nodes or at least one of the receiver nodes of the identified flows are different.

44. The transit router of claim 43, wherein the communication service provides access to state information that is shared between at least two overlay processes that maintain at least two overlay networks.

45. The transit router of claim 43 wherein a message associated with the flows is stored in at least one of system memory, disk drive, a persistent storage device associated with the transit router, or a host collocated with the transit router.

46. The transit router of claim 43, further including a coordinator process that makes at least one determination regarding coordination of the multiple flows locally in the transit router based on global state information.

47. The transit router of claim 46, wherein said at least one determination relates to at least one of admission of a flow to an overlay network, allocating an overlay network to an overlay process or allocating an overlay process to a node.

48. The transit router of claim 47, wherein admission of a flow to an overlay network is based on a priority information.

49. A transit router that routes multiple flows within a network having a plurality of nodes, the transit router comprising:
   one or more processing units, said one or more processing units running one or more message-oriented overlay networks (MOON) processes that are associated with parallel overlay networks with three or more sites and run over an underlying IP network; and
   a communication system that shares state information amongst at least two MOON processes that maintain at least two overlay networks, said state information being associated with at least two identified flows where each of the identified flows comprises a series of related packets communicated amongst a source node and at least one receiver node, wherein the source nodes or at least one of the receiver nodes of the identified flows are different.

50. The transit router of claim 49, wherein the communication service provides access to state information that is shared between at least two overlay processes that maintain at least two overlay networks.

51. The transit router of claim 49 wherein a message associated with the flows is stored in at least one of transit router's system memory or in a host collocated with the transit router.

52. The transit router of claim 49, further including a coordinator process that makes at least one determination regarding coordination of the multiple flows locally in the transit router based on global state information.

53. The transit router of claim 52, wherein said at least one determination relates to at least one of admission of a flow to an overlay network, allocating an overlay network to an overlay process or allocating an overlay process to a node.

54. The transit router of claim 53, wherein admission of a flow to an overlay network is based on a priority information.

55. A transit router that routes one or more flows within a network having a plurality of nodes where each flow comprises a series of related packets communicated amongst a source node and at least one receiver node, the transit router comprising:
   one or more processing units, said one or more processing units running one or more overlay processes associated with parallel overlay networks; and
   a communication system that replicates state information of one overlay process that maintains an overlay network by pushing the state information to be shared by at least one other overlay process that maintains another overlay network.

56. The transit router of claim 55, wherein the parallel overlay networks support multiple flows.

57. The transit router of claim 56 further including a coordinator process that uses a consistent replicated data sharing system to make global determinations locally.

58. The transit router of claim 57, wherein the consistent replicated data sharing system comprises at least one of a Congruity or Replicated Hash Table.

59. The transit router of claim 57, wherein said determinations relate to at least one of admission of a flow to an overlay network, allocating an overlay network to an overlay process or allocating an overlay node to an overlay process.

60. A transit router that routes one or more flows within a network having a plurality of nodes where each flow comprises a series of related packets communicated amongst a source node and at least one receiver node, the transit router comprising:
   one or more processing units, said one or more processing units running one or more message-oriented overlay networks (MOON) processes that are associated with parallel overlay networks with three or more sites and run over an underlying IP network; and
   a communication system that replicates state information of one MOON process that maintains an overlay network by pushing the state information to be shared by at least one other MOON process that maintains another overlay network.

61. The transit router of claim 60, wherein the parallel overlay networks support multiple flows.

62. The transit router of claim 61 further including a coordinator process that uses a consistent replicated data sharing system to make global determinations locally.

63. The transit router of claim 62, wherein the consistent replicated data sharing system comprises at least one of a Congruity or Replicated Hash Table.

64. The transit router of claim 62, wherein said determinations relate to at least one of admission of a flow to an overlay network, allocating an overlay network to an overlay process or allocating an overlay node to an overlay process.

65. A transit router that routes one or more flows within a network having a plurality of nodes where each flow comprises a series of related packets communicated amongst a source node and at least one receiver node, the transit router comprising:
   one or more processing units, said one or more processing units running one or more overlay processes associated with parallel overlay networks; and
   a group communication service that replicates state information amongst at least two overlay processes that maintain at least two overlay networks.

66. The transit router of claim 65, wherein the parallel overlay networks support multiple flows.

67. The transit router of claim 66, wherein the group communication service replicates state information amongst at least two overlay processes running in at least two transit routers associated with the parallel overlay networks.

68. The transit router of claim 66, wherein the group communication service replicates global state information amongst at least two overlay processes running in at least two super nodes associated with the parallel overlay networks.

69. The transit router of claim 66, wherein multiple overlay nodes share the same instance of the group communication service.

70. The transit router of claim 66, wherein a group communication service instance coordinates replication of state information in one or more transit routers within each super node, and another group communication service instance coordinates replication of state information between super nodes.

71. A transit router that routes one or more flows within a network having a plurality of nodes where each flow comprises a series of related packets communicated amongst a source node and at least one receiver node, the transit router comprising:
   one or more processing units, said one or more processing units running one or more message-oriented overlay networks (MOON) processes that are associated with parallel overlay networks with three or more sites and run over an underlying IP network; and a group communication service that replicates state information amongst at least two MOON processes that maintain at least two overlay networks.

72. The transit router of claim 71, wherein the parallel overlay networks support multiple flows.

73. The transit router of claim 72, wherein the group communication service replicates state information amongst at least two overlay processes running in at least two transit routers associated with the parallel overlay networks.

74. The transit router of claim 72, wherein the group communication service replicates global state information amongst at least two overlay processes running in at least two super nodes associated with the parallel overlay networks.

75. The transit router of claim 72, wherein multiple overlay nodes share the same instance of the group communication service.

76. The transit router of claim 72, wherein a group communication service instance coordinates replication of state information in one or more transit routers within each super node, and another group communication service instance coordinates replication of state information between super nodes.

77. A system for delivery of one or more flows within a network having a plurality of nodes where each flow comprises a series of related packets communicated amongst a source node and at least one receiver node, the system comprising:
one or more processing units that run a first overlay process under the control of a first operating system to perform a function in a first overlay network, and a second overlay process under the control of a second operating system to perform a function in a second overlay network, wherein said first overlay network and said second overlay network comprise parallel overlay networks; and
a communication controller that provides access to state information that is shared between the first overlay process and the second overlay process.

78. The system of claim 77, wherein the parallel overlay networks support multiple flows.

79. The system of claim 78, wherein at least one of the first operating system and the second operating system is executed in a virtual machine.

80. The system of claim 78, wherein the first operating system is different from the second operating system.

81. A system for delivery of one or more flows within a network having a plurality of nodes where each flow comprises a series of related packets communicated amongst a source node and at least one receiver node, the system comprising:
one or more processing units that run a first message-oriented overlay network (MOON) process under the control of a first operating system to perform a function in a first MOON, and a second MOON process under the control of a second operating system to perform a function in a second MOON, wherein said first MOON and said second MOON comprise parallel overlay networks with three or more sites on top of an underlying IP network; and
a communication controller that provides access to state information that is shared between the first overlay process and the second overlay process.

82. The system of claim 81, wherein the parallel overlay networks support multiple flows.

83. The system of claim 82, wherein at least one of the first operating system and the second operating system is executed in a virtual machine.

84. The system of claim 82, wherein the first operating system is different from the second operating system.

85. A system for delivery of content within a network that has one or more destination nodes, the system comprising:
a plurality of sites, each having at least one transit router, said at least one transit router executing a plurality of overlay processes that are associated with parallel overlay networks; and
an inter-site network that delivers content to the destination nodes via plurality of live flows where each of the flows comprises a series of related packets communicated amongst a source node and at least one receiver node, wherein the source nodes or at least one of the receiver nodes of at least two of the flows are different; and
a service controller that controls delivery of content to one or more destination nodes based on a service request received from destination nodes, said service requests relating to state information shared amongst at least two overlay processes that maintain at least two overlay networks.

86. The system of claim 85, wherein the at least one transit router recovers lost packets based on an attribute associated with a delivered content.

87. The system of claim 86, wherein the attribute relates to an I frame or a P frame of an MPEG content.

88. The system of claim 85, wherein the service controller supports at least one of interactive services or flow replay.

89. The system of claim 85, wherein the underlying network comprises the Internet.

90. The system of claim 85, wherein the content comprises at least one of a video stream or a game stream.

91. A system for delivery of content within a network that has one or more destination nodes, the system comprising:
a plurality of sites, each having at least one transit router, said at least one transit router executing a plurality of message-oriented overlay network (MOON) processes that are associated with parallel overlay networks with three or more sites and run over an underlying IP network; and
an inter-site network that delivers content to the destination nodes via plurality of live flows where each of the flows comprises a series of related packets communicated amongst a source node and at least one receiver node, wherein the source nodes or at least one of the receiver nodes of at least two of the flows are different; and
a service controller that controls delivery of content to one or more destination nodes based on a service request received from destination nodes, said service requests relating to state information shared amongst at least two MOON processes that maintain at least two MOONs.

92. The system of claim 91, wherein the at least one transit router recovers lost packets based on an attribute associated with a delivered content.

93. The system of claim 92, wherein the attribute relates to an I frame or a P frame of an MPEG content.

94. The system of claim 91, wherein the service controller supports at least one of interactive services or flow replay.

95. The system of claim 91, wherein the underlying network comprises the Internet.

96. The system of claim 91, wherein the content comprises at least one of a video stream or a game stream.

97. A system for delivery of one or more flows within a network that has one or more destination nodes where each flow comprises a series of related packets communicated amongst a source node and at least one receiver node, the system comprising:

a plurality of sites each having at least one transit router, said at least one transit router executing a plurality of overlay processes that are associated with parallel overlay networks; and an inter-site network that delivers flows to the destination nodes; said flows being delivered over a plurality of physical links that are associated with a plurality of bandwidth costs; and one or more nodes executing one or more quality measurement processes associated with one or more flows, wherein the one or more flows are delivered to the destination nodes over links selected based on at least one of bandwidth cost and quality measurement.

98. The system of claim 97, wherein the parallel overlay networks support multiple live flows.

99. The system of claim 98, wherein the quality measure relates to at least one of latency, jitter or link reliability.

100. The system of claim 98, wherein the flows are delivered to the destination nodes based on at least one of a routing weight, available bandwidth or a hop-count.

101. The system of claim 98, wherein each overlay network is assigned IP addresses, each of which is claimed by one overlay node.

102. The system of claim 98 further including a communication system that shares state information amongst at least two overlay processes that maintain at least two overlay networks.

103. The system of claim 102, wherein the state information relates to a resource allocated to an overlay node.

104. The system of claim 102, wherein the communication system shares information related to a flow allocated to an overlay networks.

105. The system of claim 102, wherein the communication system shares information related to a flow delivered to a destination node.

106. The system of claim 97, wherein at least one transit router selects links to optimize bandwidth costs while ensuring that the routing tree maintains a defined quality measure.

107. A system for delivery of one or more flows within a network that has a one or more destination nodes where each flow comprises a series of related packets communicated amongst a source node and at least one receiver node, the system comprising:

a plurality of sites each having at least one transit router, said at least one transit router executing a plurality of message-oriented overlay network (MOON) processes that are associated with parallel overlay networks with three or more sites and run over an underlying IP network; and an inter-site network that delivers flows to the destination nodes; said flows being delivered over a plurality of physical links that are associated with a plurality of bandwidth costs; and one or more nodes executing one or more quality measurement processes associated with one or more flows, wherein the one or more flows are delivered to the destination nodes over links selected based on at least one of bandwidth cost and quality measurement.

108. The system of claim 107, wherein the parallel overlay networks support multiple live flows.

109. The system of claim 108, wherein the quality measure relates to at least one of latency, jitter or link reliability.

110. The system of claim 108, wherein the flows are delivered to the destination nodes based on at least one of a routing weight, available bandwidth or a hop-count.

111. The system of claim 108, wherein each overlay network is assigned IP addresses, each of which is claimed by one overlay node.

112. The system of claim 108 further including a communication system that shares state information amongst at least two overlay processes that maintain at least two overlay networks.

113. The system of claim 112, wherein the state information relates to a resource allocated to an overlay node.

114. The system of claim 112, wherein the communication system shares information related to a flow allocated to an overlay networks.

115. The system of claim 112, wherein the communication system shares information related to a flow delivered to a destination node.

116. The system of claim 107, wherein at least one transit router selects links to optimize bandwidth costs while ensuring that the routing tree maintains a defined quality measure.

117. A system for delivery of one or more flows within a network having a plurality of nodes where each flow comprises a series of related packets communicated amongst a source node and at least one receiver node, the system comprising:

at least two transit routers, each executing one or more overlay processes that are associated with parallel overlay networks; and a pairing of each shadow overlay process to a corresponding existing overlay process in a manner that causes them to execute on different transit routers; and a fault-tolerant service that monitors the health of overlay processes and notifies the shadow overlay process of the failure of the corresponding overlay process.

118. The system of claim 117, further comprising a packet duplicator service that delivers a duplicate copy of packets that arrive at an overlay process to the corresponding shadow overlay process and wherein the shadow overlay process receives and temporarily stores the packets that arrive at it.

119. The system of claim 118, wherein the parallel overlay networks support multiple live flows.

120. A system for delivery of one or more flows within a network having a plurality of nodes where each flow comprises a series of related packets communicated amongst a source node and at least one receiver node, the system comprising:

at least two transit routers, each executing one or more message-oriented overlay network (MOON) processes that are associated with parallel overlay networks with three or more sites and run over an underlying IP network; and a pairing of each shadow MOON process to a corresponding existing MOON process in a manner that causes them to execute on different transit routers; and a fault-tolerant service that monitors the health of MOON processes and notifies the shadow MOON process of the failure of the corresponding MOON process.

121. The system of claim 120, further comprising a packet duplicator service that delivers a duplicate copy of packets that arrive at an overlay process to the corresponding shadow overlay process and wherein the shadow overlay process receives and temporarily stores in system memory the packets that arrive at it.

122. The system of claim 121, wherein the parallel overlay networks support multiple live flows.

* * * * *